United States Patent
Bai et al.

(10) Patent No.: US 9,698,958 B2
(45) Date of Patent: Jul. 4, 2017

(54) METHOD AND APPARATUS FOR DETERMINING AND REPORTING CHANNEL QUALITY INDICATOR FOR TEMPORALLY UNCORRELATED CHANNELS

(71) Applicant: QUALCOMM Incorporated, San Diego, CA (US)

(72) Inventors: Linda Yunlu Bai, San Jose, CA (US); Cheng-An Yang, Los Angeles, CA (US); Harish Venkatachari, Sunnyvale, CA (US); Nate Chizgi, Sunnyvale, CA (US); Shashank Maiya, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 14/667,092

(22) Filed: Mar. 24, 2015

(65) Prior Publication Data

US 2016/0112163 A1    Apr. 21, 2016

Related U.S. Application Data

(60) Provisional application No. 62/066,834, filed on Oct. 21, 2014.

(51) Int. Cl.
*H04L 5/00*    (2006.01)
*H04W 72/08*   (2009.01)
(Continued)

(52) U.S. Cl.
CPC ............ *H04L 5/006* (2013.01); *H04L 1/0002* (2013.01); *H04L 1/0006* (2013.01);
(Continued)

(58) Field of Classification Search
CPC .. H04B 7/0632; H04B 7/0621; H04B 7/0636; H04L 2027/002; H04L 27/2646;
(Continued)

(56) References Cited

U.S. PATENT DOCUMENTS

| 8,644,181 B2 | 2/2014 | Zhao et al. |
| 2005/0053038 A1* | 3/2005 | Kimura ................ H04L 1/0021 370/333 |

(Continued)

FOREIGN PATENT DOCUMENTS

EP    1513282 A2    3/2005

OTHER PUBLICATIONS

"Novel SINR-to-CQI Mapping Maximizing the Throughput in HSDPA"; Springer et al.; Wireless Communications and Networking Conference; Mar. 11-15, 2007 (conference).*

(Continued)

*Primary Examiner* — Benjamin H Elliott, IV
(74) *Attorney, Agent, or Firm* — Larry J. Moskowitz

(57) ABSTRACT

Various aspects of the disclosure provide a method of operating a user equipment (UE) to determine and report a throughput enhancing channel quality indicator (CQI) value when a physical channel between the UE and a base station is temporally uncorrelated. Reporting such CQI value may maximize the throughput of the channel when it remains temporally uncorrelated. In one aspect of the disclosure, the UE communicates with a base station utilizing a channel and determines that the channel is temporally uncorrelated. The UE further determines a plurality of CQIs in a first CQI reporting mode and computes the respective throughputs of the channel based on the plurality of CQIs. In addition, the UE selects a CQI of the plurality of CQIs corresponding to the highest throughput among the plurality of throughputs, and reports the selected CQI to the base station in a second
(Continued)

CQI reporting mode while the channel remains temporally uncorrelated.

24 Claims, 14 Drawing Sheets

(51) Int. Cl.
    *H04L 1/00*           (2006.01)
    *H04W 88/06*       (2009.01)

(52) U.S. Cl.
    CPC .......... *H04L 1/0026* (2013.01); *H04L 1/0033* (2013.01); *H04L 5/0048* (2013.01); *H04L 5/0057* (2013.01); *H04W 72/085* (2013.01); *H04W 88/06* (2013.01)

(58) Field of Classification Search
    CPC ...... H04L 5/0057; H04L 5/006; H04W 72/08; H04W 72/085
    See application file for complete search history.

(56) References Cited

U.S. PATENT DOCUMENTS

| | | | | |
|---|---|---|---|---|
| 2010/0079279 A1* | 4/2010 | Watson | ............... | A61B 5/14551 340/540 |
| 2012/0099446 A1* | 4/2012 | Su | ........................ | H04L 1/0003 370/252 |
| 2012/0269143 A1* | 10/2012 | Bertrand | ........... | H04W 72/1231 370/329 |
| 2014/0003395 A1 | 1/2014 | Hsu et al. | | |
| 2014/0112413 A1 | 4/2014 | Ro et al. | | |
| 2014/0133317 A1 | 5/2014 | Chen et al. | | |
| 2014/0169295 A1 | 6/2014 | Roh et al. | | |
| 2014/0211694 A1 | 7/2014 | He et al. | | |
| 2014/0348120 A1 | 11/2014 | Kant et al. | | |
| 2015/0071095 A1* | 3/2015 | Phan Huy | ............. | H04L 27/261 370/252 |
| 2015/0195737 A1* | 7/2015 | Tabet | .................. | H04L 43/0888 455/405 |
| 2016/0087777 A1* | 3/2016 | Ihm | ...................... | H04B 17/309 370/252 |
| 2016/0112163 A1* | 4/2016 | Bai | ........................ | H04L 1/0002 370/252 |
| 2016/0173208 A1* | 6/2016 | Kuchi | ................. | H04W 72/085 375/267 |

OTHER PUBLICATIONS

International Search Report and Written Opinion—PCT/US2015/051761—ISA/EPO—Dec. 4, 2015.

* cited by examiner

Access Network

METHOD AND APPARATUS FOR DETERMINING AND REPORTING CHANNEL QUALITY INDICATOR FOR TEMPORALLY UNCORRELATED CHANNELS

CROSS-REFERENCE TO RELATED APPLICATIONS

This application claims priority to and the benefit of provisional patent application No. 62/066,834 filed in the United States Patent and Trademark Office on 21 Oct. 2014, the entire content of which is incorporated herein by reference.

TECHNICAL FIELD

The technology discussed below relates generally to wireless communication systems, and more particularly, to channel quality indicator determination and reporting in wireless communications.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

In HSPA networks, the network sends data with different transport block sizes (TBS) depending on a Channel Quality Indicator (CQI) reported by a user equipment (UE). For example, The CQI can be a value from 0 to 30 indicating the quality of the communication channel between the UE and the network. The higher the CQI index value is, the better the channel quality becomes. The network transmits data to the UE with different transport block sizes based on the reported CQI value. If the network gets a high CQI value from the UE, the network transmits data with a larger transport block size, and vice-versa. Therefore, data throughput of the communication is affected by the CQI value. More information on the CQI, for example, may be found in the 3GPP Technical Specification (TS) 25.214, Physical Layer Procedures (FDD), Release 12. The entire content of this 3GPP document is incorporated herein by reference.

As the demand for mobile broadband access continues to increase, research and development continue to advance the UMTS technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects of the disclosure, a UE reports the same CQI value to a base station when the physical channel (propagation channel) between the UE and the base station is temporally uncorrelated. Reporting such CQI value may enhance or maximize the throughput of the channel when it is temporally uncorrelated.

In one aspect, the disclosure provides a method of reporting channel quality operable at a user equipment (UE). The UE communicates with a base station utilizing a channel and determines that the channel is temporally uncorrelated. The UE further determines a plurality of channel quality indicators (CQIs) in a first CQI reporting mode and computes the respective throughputs of the channel based on the plurality of CQIs. In addition, the UE selects a CQI of the plurality of CQIs corresponding to the highest throughput among the plurality of throughputs, and reports the selected CQI to the base station in a second CQI reporting mode while the channel remains temporally uncorrelated. In the second CQI reporting mode, the UE reports the same CQI value to the base station when the channel is temporally uncorrelated.

Another aspect of the disclosure provides a user equipment (UE) configured to report channel quality in a wireless communication network. The UE includes means for communicating with a base station utilizing a channel and means for determining that the channel is temporally uncorrelated. The UE further includes means for determining a plurality of channel quality indicators (CQIs) in a first CQI reporting mode and computing the respective throughputs of the channel based on the plurality of CQIs. The UE further includes means for selecting a CQI of the plurality of CQIs corresponding to the highest throughput among the plurality of throughputs. In addition, the UE includes means for reporting the selected CQI to the base station in a second QCI reporting mode while the channel remains temporally uncorrelated. In the second CQI reporting mode, the UE reports the same CQI value to the base station when the channel is temporally uncorrelated.

Another aspect of the disclosure provides a user equipment (UE) configured to report channel quality in a wireless communication network. The UE includes a memory with a channel quality reporting code, a communication interface configured to communicate with a base station utilizing a channel, and at least one processor operatively coupled with the memory and the communication interface. The at least one processor when configured by the channel quality reporting code, includes a channel correlation block, a channel quality indicator (CQI) determination block, and a CQI selection block.

The channel correlation block is configured to determine that the channel is temporally uncorrelated. The CQI determination block is configured to measure a plurality of channel quality indicators (CQIs) in a first CQI reporting mode and compute the respective throughputs of the channel based on the plurality of CQIs. The CQI selection block configured to select a CQI of the plurality of CQIs corresponding to the highest throughput among the plurality of throughputs, and report the selected CQI to the base station in a second CQI reporting mode while the channel remains temporally uncorrelated. In the second CQI reporting mode, the UE reports the same CQI value to the base station when the channel is temporally uncorrelated.

Another aspect of the disclosure provides a computer-readable storage medium including channel quality indicator (CQI) reporting code for causing a user equipment (UE) to perform various operations. The CQI reporting code causes the UE to communicate with a base station utilizing a channel, determine that the channel is temporally uncorrelated. The CQI reporting code causes the UE to determine a plurality of channel quality indicators (CQIs) in a first CQI reporting mode and compute the respective throughputs of the channel based on the plurality of CQIs. The UE selects a CQI of the plurality of CQIs corresponding to the highest throughput among the plurality of throughputs. In addition, the CQI reporting code causes the UE to report the selected CQI to the base station in a second CQI reporting mode while the channel remains temporally uncorrelated. In the second CQI reporting mode, the UE reports the same CQI value to the base station when the channel is temporally uncorrelated.

These and other aspects of the disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In various aspects of the disclosure, a throughput enhancing CQI reporting scheme is disclosed for both static communication channels and rapidly varying communication channels. In some examples, the channels may be HSPA channels such as high speed downlink packet access (HSDPA) channels. However, the present disclosure may be applied to other suitable wireless channels in the same or different standards. In this throughput enhancing CQI reporting scheme, the throughput for high speed (HS) channels (e.g., HSDPA channels) can be improved (e.g., optimized or maximized) by transmitting a CQI with a certain value (e.g., a fixed value) irrespective of the current state of the channel under certain conditions. In some aspects of the disclosure, the time or temporal correlation of the channels may be used as a metric or condition to classify or qualify the channels for throughput enhancing CQI reporting apart from the other channels where such CQI reporting scheme may not be suitable. Some aspects of the disclosure also provide a two-stage algorithm that may improve channel throughput with a CQI reporting mechanism that identifies the throughput enhancing CQI value in real time.

In this disclosure, temporal correlation of a channel refers to the similarity of a signal in the channel at different points in time. In some literature, it may be referred to as autocorrelation or serial correlation. Temporal correlation may be determined in various methods which will be described in more detail below. In one example, the signal-to-interference-plus-noise ratio of the channel and its covariance may be used to determine the channel's temporal correlation.

Figure 1:
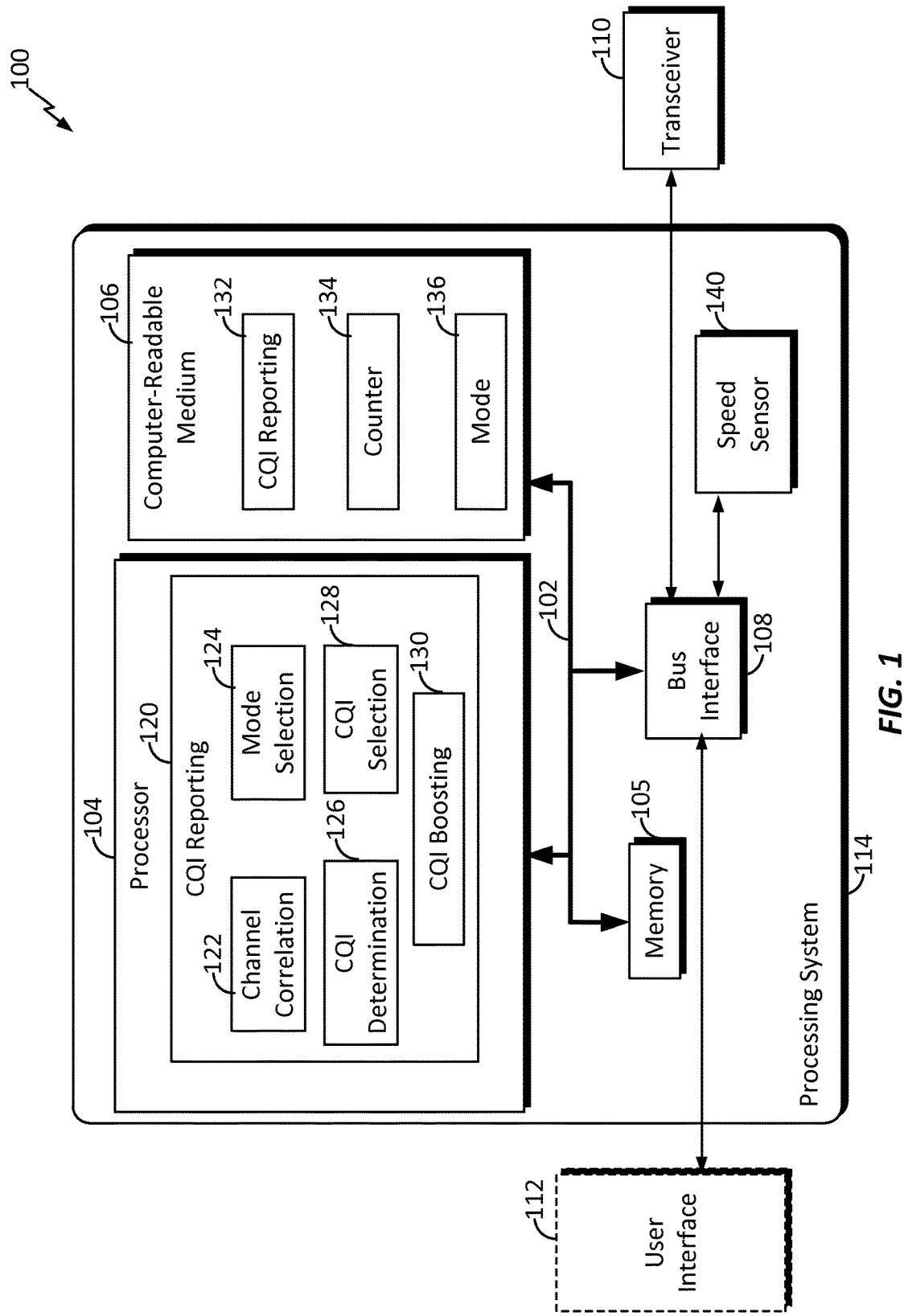
FIG. 1 is a block diagram illustrating an example of a hardware implementation for an apparatus employing a processing system according to aspects of the disclosure.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. For example, the apparatus 100 may be a user equipment (UE) as illustrated in any one or more of FIGS. 2, 3, and/or 5. In another example, the apparatus 100 may be a radio network controller (RNC) as illustrated in any one or more of FIGS. 2 and/or 3. In yet another example, the apparatus 100 may be a Node B as illustrated in any one or more of FIGS. 2, 3, and/or 5. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. For example, the processor 104, as utilized in an apparatus 100, may be used to implement any one or more of the processes and functions described below and illustrated in FIGS. 6-10.

In this example, the processing system 114 may be implemented with a bus architecture, represented generally by a bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick, touchscreen, touchpad, gesture sensor) may also be provided.

The apparatus 100 may include a speed sensor 140 that can be configured to determine the speed or movement of the apparatus 100. Non-limiting examples of the speed sensor 140 include accelerometer, satellite-based positioning sensor, motion sensor, etc. In some aspects of the disclosure, the apparatus 100 may determine its speed and/or position by using Doppler effect.

The processor 104 includes a CQI reporting block 120 that can be configured to perform various CQI reporting functions and procedures described below in relation to FIGS. 6-10. In one aspect of the disclosure, the CQI reporting block 120 includes one or more components including a channel correlation block 122, a mode selection block 124, a CQI determination block 126, a CQI selection block 128, and a CQI boosting block 130. The channel correlation block 122 may be utilized to determine a temporal correlation of a channel. The mode selection block 124 may be utilized to select different CQI reporting modes supported by the apparatus. The CQI determination block 126 may be utilized to determine a CQI of a channel. The CQI selection block 128 may be utilized to determine and report a CQI value to improve (e.g., maximize or optimize) the throughput of a channel (e.g., a temporally uncorrelated channel). The CQI boosting block 130 may be utilized to boost or increase the CQI by a predetermined or adaptive value under certain conditions. The CQI reporting block 120 and its various components will be described in more detail below in reference to FIGS. 6-10.

The processor 104 is also responsible for managing the bus 102 and general processing, including the execution of software stored on the computer-readable medium 106. The software, when executed by the processor 104, causes the processing system 114 to perform the various functions described below for any particular apparatus. The computer-readable medium 106 may also be used for storing data that is manipulated by the processor 104 when executing software.

In one aspect of the disclosure, the software may include a CQI reporting code 132 when executed by the processor 104, can configure the processor 104 (e.g., CQI reporting block 120) to perform various functions including the CQI reporting functions described below in reference to FIGS. 6-10. The computer-readable medium 106 may be used to store a counter variable 134 and a mode variable 136, which may be utilized in CQI reporting related functions and will be described in more detail below.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
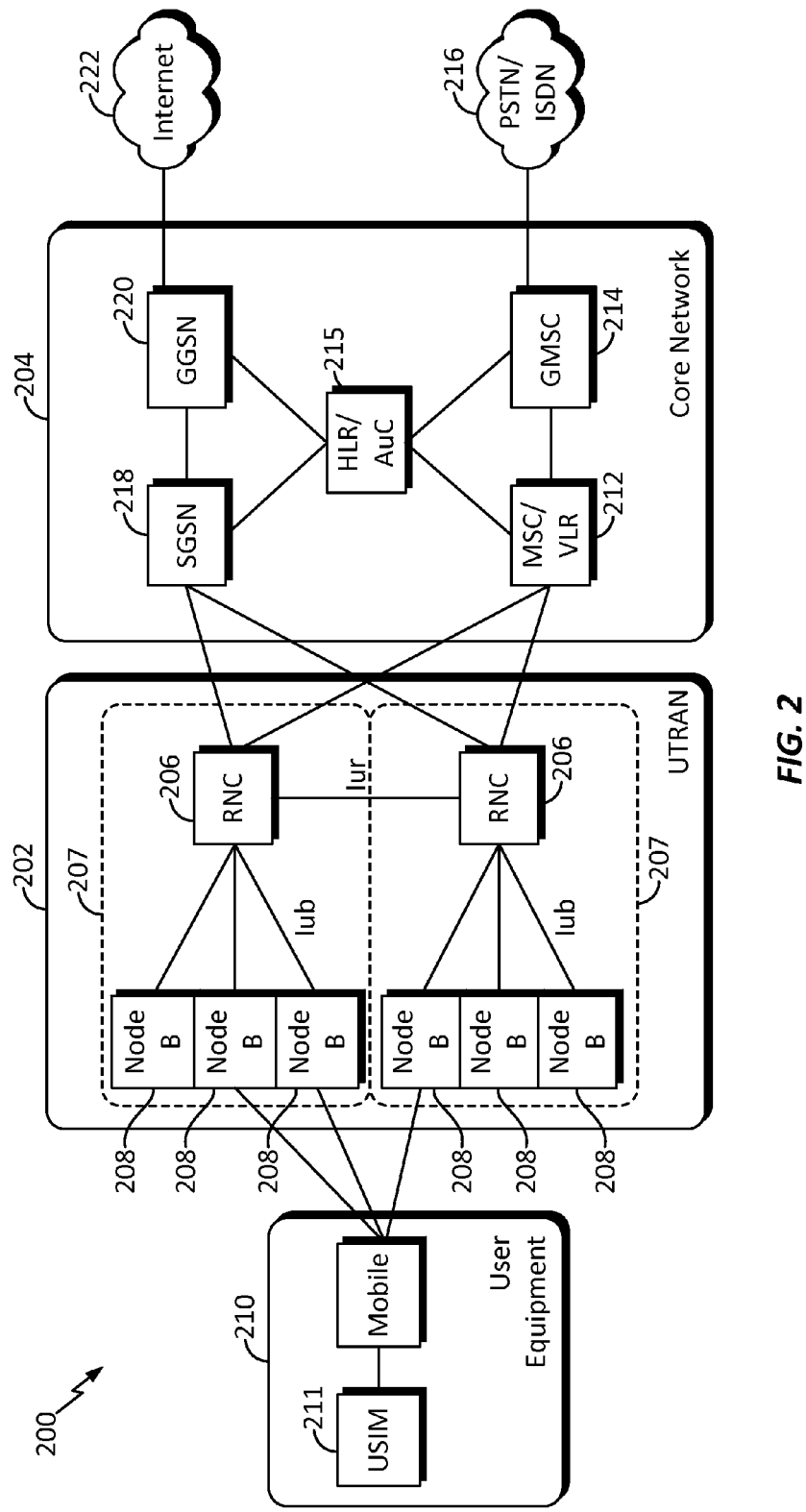
FIG. 2 is a block diagram conceptually illustrating an example of a telecommunications system according to aspects of the disclosure.
Figure 3:
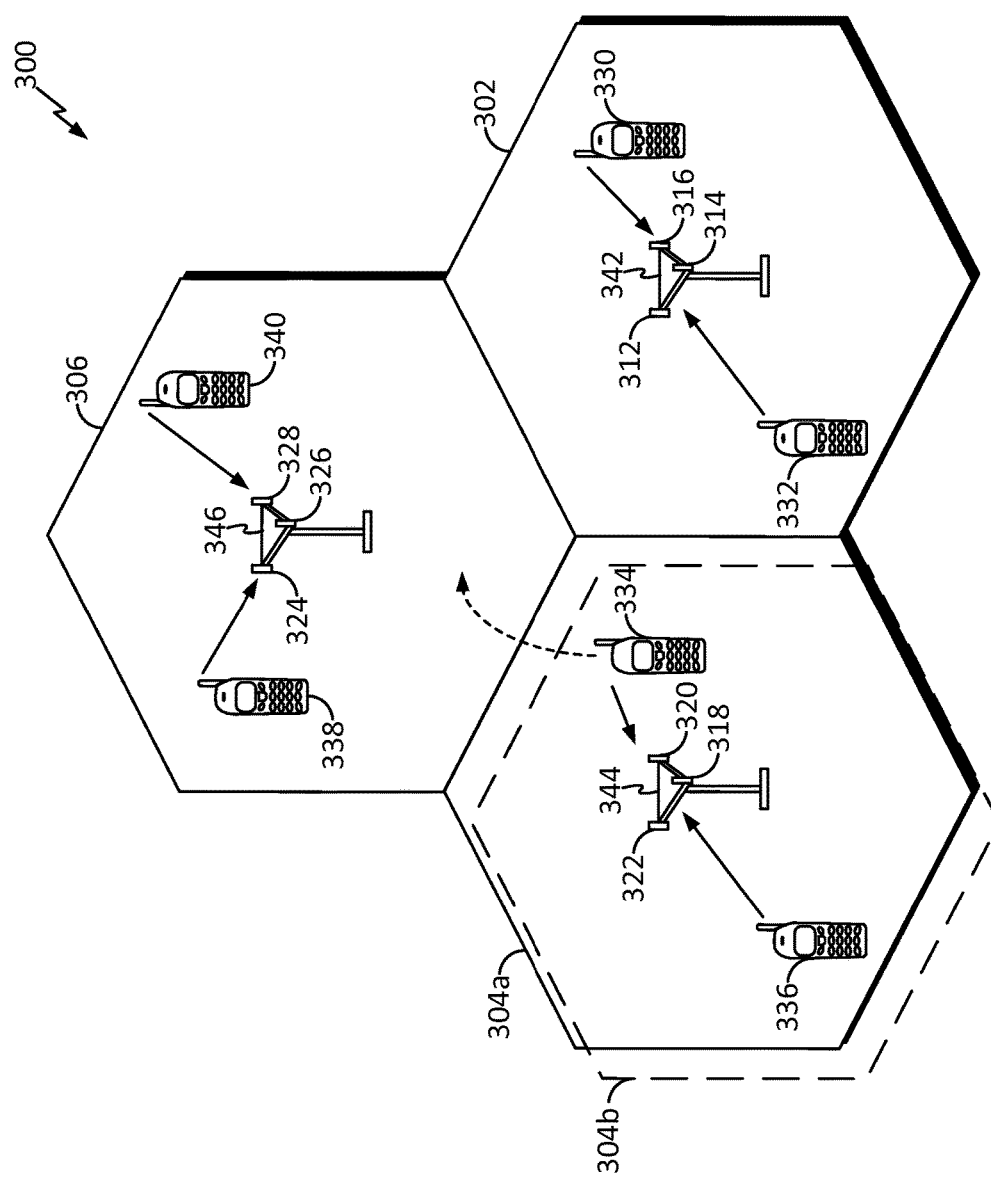
FIG. 3 is a diagram illustrating an example of an access network according to aspects of the disclosure.

The circuitry, components, or blocks of the apparatus 100 are merely provided as an example, and other means for carrying out the described functions, algorithms, and procedures of FIGS. 6-10 may be included within various aspects of the present disclosure, including but not limited to the instructions stored in the computer-readable storage medium 106, or any other suitable apparatus or means described in any one of the FIGS. 2, 3 and/or 5 and utilizing, for example, the processes and/or algorithms described herein in relation to FIGS. 6-10.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and a user equipment (UE) 210. The UE 210 may be any of the UEs illustrated in FIGS. 2, 3, and/or 5. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network. In some aspects of the disclosure, the UTRAN 202 may utilizing high speed channels such as HSDPA channels to communicate with the UE 210.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, an Internet of Things device, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN (e.g., RAN 300 of FIG. 3), or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

A high speed packet access (HSPA) air interface includes a series of enhancements to the 3G/W-CDMA air interface between the UE 210 and the UTRAN 202, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

For example, in Release 5 of the 3GPP family of standards, HSDPA was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCH. The UE may continuously monitor the HS-SCCH to determine when to read its data from the HS-DSCH and to determine the modulation scheme used on the assigned physical channel.

The HS-PDSCH is a physical channel that may be shared by several UEs and may carry downlink data for the high-speed downlink. The HS-PDSCH may support quadrature phase shift keying (QPSK), 16-quadrature amplitude modulation (16-QAM), and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

One difference on the downlink between Release-5 HSDPA and the previously standardized circuit-switched air-interface is the absence of soft handover in HSDPA. This means that HSDPA channels are transmitted to the UE from a single cell called the HSDPA serving cell. As the user moves, or as one cell becomes preferable to another, the HSDPA serving cell may change. Still, the UE may be in soft handover on the associated DPCH, receiving the same information from plural cells.

In Release 5 HSDPA, at any instance a UE 210 has one serving cell: the strongest cell in the active set as according to the UE measurements of $E_c/I_0$. According to mobility procedures defined in Release 5 of 3GPP TS 25.331, the radio resource control (RRC) signaling messages for changing the HSPDA serving cell are transmitted from the current HSDPA serving cell (i.e., the source cell) and not the cell that the UE reports as being the stronger cell (i.e., the target cell).

3GPP Release 6 specifications introduced uplink enhancements referred to as Enhanced Uplink (EUL) or High Speed Uplink Packet Access (HSUPA). HSUPA utilizes as its transport channel the EUL Dedicated Channel (E-DCH). The E-DCH is transmitted in the uplink together with the Release 99 DCH. The control portion of the DCH, that is, the DPCCH, carries pilot bits and downlink power control commands on uplink transmissions. In the present disclosure, the DPCCH may be referred to as a control channel (e.g., a primary control channel). The Node B also broadcasts a pilot channel, for example, a Common Pilot Channel (CPICH) channel (e.g., a primary pilot channel).

The E-DCH is implemented by physical channels including the E-DCH Dedicated Physical Data Channel (E-DPDCH) and the E-DCH Dedicated Physical Control Channel (E-DPCCH). In addition, HSUPA relies on additional physical channels including the E-DCH HARQ Indicator Channel (E-HICH), the E-DCH Absolute Grant Channel (E-AGCH), and the E-DCH Relative Grant Channel (E-RGCH).

The UTRAN 202 is one example of a RAN that may be utilized in accordance with the present disclosure. Referring to FIG. 3, by way of example and without limitation, a simplified schematic illustration of a RAN 300 in a UTRAN architecture is illustrated. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 204 (see FIG. 2) for all the UEs 330, 332, 334, 336, 338, and 340 in the respective cells 302, 304, and 306. Any of the UEs in FIG. 3 may be the UEs illustrated in FIGS. 1, 2, and/or 5. The UEs may communicate with the cells 302, 304, and 306 utilizing high speed channels such as HSDPA channels.

During a call with a source cell, or at any other time, the UE 336 may monitor various parameters of the source cell as well as various parameters of neighboring cells. Further, depending on the quality of these parameters, the UE 336 may maintain communication with one or more of the neighboring cells. During this time, the UE 336 may maintain an Active Set, that is, a list of cells to which the UE 336 is simultaneously connected (i.e., the UTRAN cells that are currently assigning a downlink dedicated physical channel DPCH or fractional downlink dedicated physical channel F-DPCH to the UE 336 may constitute the Active Set).

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 4:
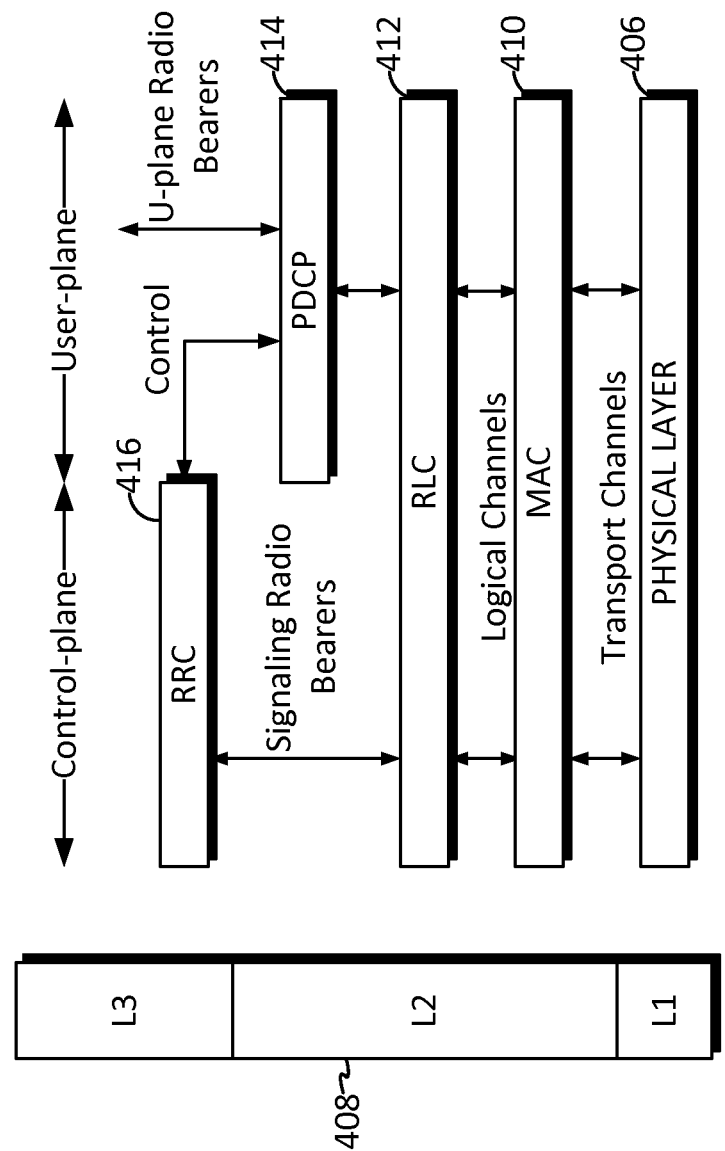
FIG. 4 is a diagram illustrating an example of a radio protocol architecture for the user and control plane according to aspects of the disclosure.

Turning to FIG. 4, the AS is shown with three layers: Layer 1, Layer 2, and Layer 3. Layer 1 is the lowest layer and implements various physical layer signal processing functions. Layer 1 will be referred to herein as the physical layer 406. The data link layer, called Layer 2 408, is above the physical layer 406 and is responsible for the link between the UE 210 and Node B 208 over the physical layer 406.

At Layer 3, the RRC layer 416 handles the control plane signaling between the UE 210 and the Node B 208. RRC layer 416 includes a number of functional entities for routing higher layer messages, handling broadcasting and paging functions, establishing and configuring radio bearers, etc.

In the illustrated air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between Node Bs.

The RLC sublayer 412 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

The MAC sublayer 410 includes various MAC entities, including but not limited to a MAC-d entity and MAC-hs/ehs entity. The Radio Network Controller (RNC) houses protocol layers from MAC-d and above. For the high speed channels, the MAC-hs/ehs layer is housed in the Node B.

From the UE side, The MAC-d entity is configured to control access to all the dedicated transport channels, to a MAC-c/sh/m entity, and to the MAC-hs/ehs entity. Further, from the UE side, the MAC-hs/ehs entity is configured to handle the HSDPA specific functions and control access to the HS-DSCH transport channel. Upper layers configure which of the two entities, MAC-hs or MAC-ehs, is to be applied to handle HS-DSCH functionality.

Figure 5:
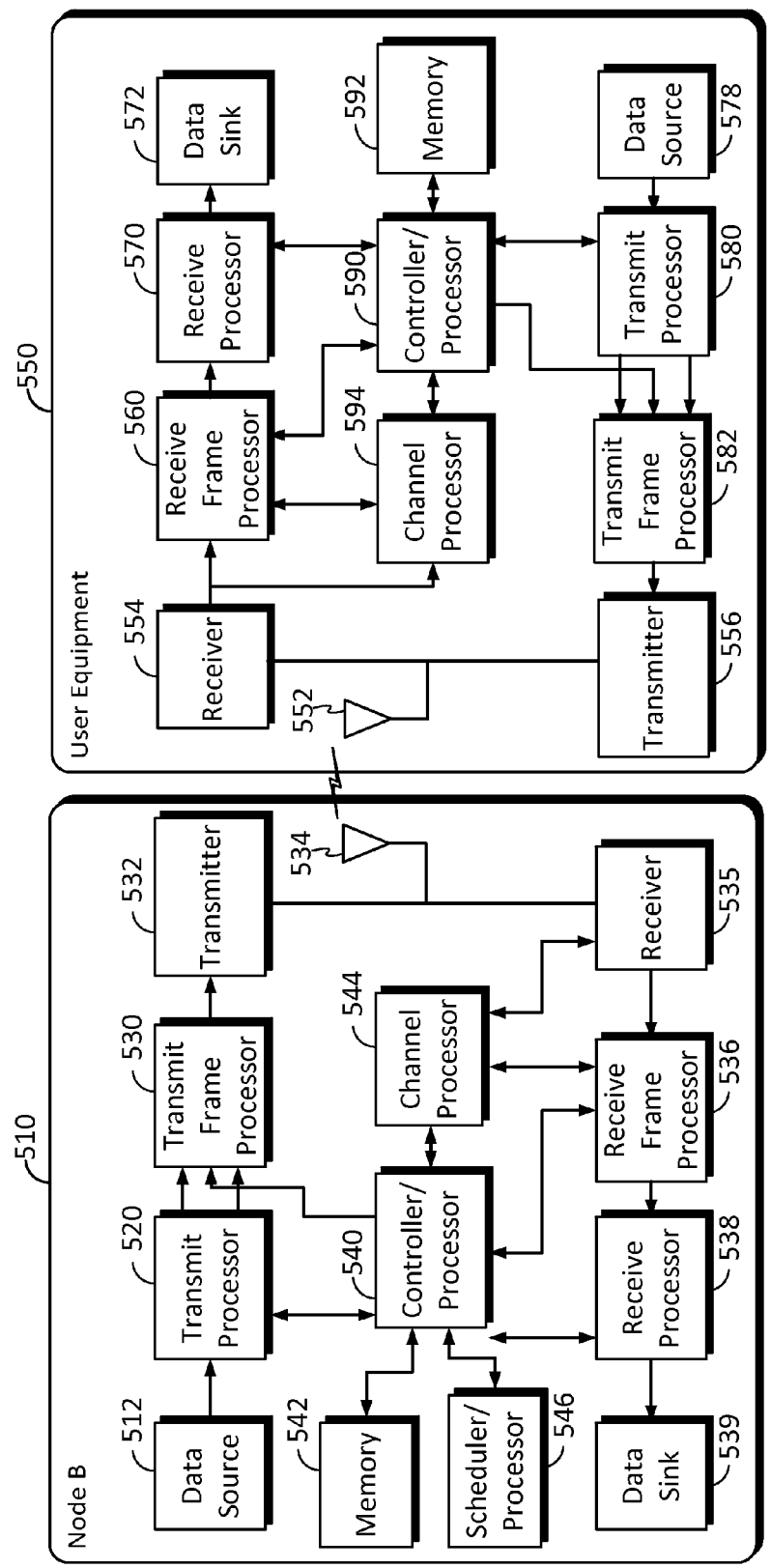
FIG. 5 is a block diagram conceptually illustrating an example of a Node B in communication with a user equipment (UE) in a telecommunications system according to aspects of the disclosure.

FIG. 5 is a block diagram of an exemplary Node B 510 in communication with an exemplary UE 550, where the Node B 510 may be the Node B 208 in FIG. 2, and the UE 550 may be the UE 210 in FIG. 2. In some aspects of the disclosure, the Node B 510 and/or the UE 550 may be implemented using one or more of the apparatuses 100. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

As discussed above, in UMTS, a UE uses the HS-DPCCH to report a CQI to a Node B as an indicator of downlink HSDPA channel quality. The Node B's selection of the transport block size (TBS), number of information bits per packet, number of channelization codes, modulation and resource allocation choices such as HS-PDSCH transmit power allocation, are based on the reported CQI. According to 3GPP TS 25.214, the CQI reference period (CQI measurement period) is defined as "a 3-slot reference period ending 1 slot before the start of the first slot in which the reported CQI value is transmitted." Therefore, a feedback delay between the time when the UE reports CQI and the time when the UE receives the corresponding TBS in a TBS received period, can be around 4 to 8 subframes (e.g., 8 milliseconds (ms) to 16 ms in time). As a result, the reported CQI can be outdated if the channel is temporally uncorrelated. In one example, the signal-to-interference-plus-noise ratio (SINR) of the channel in the CQI reference period and that of the channel four subframes later, may be used to determine whether or not the channel is un-correlated. For example, the channel is temporally uncorrelated if the Pearson's correlation coefficient (known to those of ordinary skill in the art) of the SINRs is less than a certain threshold. The choice of threshold depends on how the SINRs are computed, and an example of the threshold may be a value between 0 and 1. In one particular example, the threshold may be 0.4. In the following illustrative example, a delay of four subframes is used. However, the present disclosure can be applied to any suitable delay between the CQI reference period and the TBS received period. In some aspects of the disclosure, the delay can be estimated by hypothesis testing.

The throughput of a UE can be modeled or determined as a function of TBS and the corresponding block error rate (BLER) under a given channel condition. BLER is an analysis of transmission errors on the radio interface. BLER may be based on an analysis of cyclic redundancy check (CRC) results for RLC transport blocks, and computed by defining the relation between the numbers of RLC transport blocks with CRC error indication and the total number of transmitted transport blocks.

In one example, it is assumed that the maximum number of retransmissions is K for a certain channel. The BLER for the $k^{th}$ transmission of TBS $m_i$ is denoted as $B_k(m_i)$, where i is the CQI (CQI value or index). Let $\gamma$ be the current signal-to-noise ratio (SNR). The "net" number of bits successfully decoded can be modelled by an equation (1).

$$h(i,\gamma)=m_i(1-B_K(m_i,\gamma)) \qquad (1)$$

The number of subframes transmitted is given by an equation (2).

$$g(i,\gamma)=\Sigma_{k=1}^{K}k(B_{k-1}(m_i,\gamma)-B_k(m_i,\gamma))+KB_K(m_i,\gamma) \qquad (2)$$

The total number of time used for transmission is proportional to the number of subframes. For example, in HSDPA, each subframe is 2 ms. Therefore, the UE throughput can be defined by an equation (3).

$$T = \frac{\int_0^\infty \sum_{i=1}^{M} h(i,\gamma) f_{\Lambda_{n-4}\Gamma_n}(i,\gamma)d\gamma}{\int_0^\infty \sum_{i=1}^{M} g(i,\gamma) f_{\Lambda_{n-4}\Gamma_n}(i,\gamma)d\gamma}, \qquad (3)$$

where $\Lambda_{n-4}$ is the CQI index reported to Node B at subframe n−4, $\Gamma_n$ is the SNR at subframe n, M is the maximum CQI (or TBS index), and $f_{\Lambda_{n-4}\Gamma_n}$ is the joint probability distribution of $\Lambda_{n-4}$ and $\Gamma_n$. In the above derivations, TBS is indexed by CQI value. In this example, CQI is the TBS index, valued from 0 to 30. However, in some other examples, one CQI can correspond to multiple TBS's, where these multiple TBS's correspond to the same CQI, but have different indices.

In typical UMTS networks, due to Node B resource allocation and CQI filtering algorithms, there might not be a one-to-one correspondence between the CQI index and the TBS. In addition, it can be shown that equation (3) may not a convex function of CQI/TBS index due to HARQ retransmission gain and diversity gain during retransmissions in channels with low temporal coherence (temporal correlation). In some examples, the UE's throughput based on equation (3) is not a convex function of the CQI/TBS Index for a given geometry and/or channel model. For example, the channel model may be the International Telecommunication Union (ITU) vehicular A Speed 120 km/h (VA120) or other suitable models.

In some aspects of the present disclosure, a method is provided for determining the reported CQI value (e.g., an optimal CQI) that can maximize equation (3) (i.e., maximizing UE throughput), given the channel has a low temporal correlation (e.g., temporally uncorrelated). A channel may be considered temporally uncorrelated when the SINR of the channel in the CQI reference period (a first period) and that of the channel during a TBS received period (a second period), are substantially un-correlated. The TBS received period is the time slot when the TBS corresponding to the previously reported CQI is received at the UE. In some examples, the time between a CQI reference period and a TBS received period is between 4 and 8 subframes (or between 8 ms to 16 ms). For example, the channel may be temporally uncorrelated when an autocorrelation coefficient is less than a certain threshold. In other words, for a temporally uncorrelated channel, the previous reported CQI value may not reflect the current channel quality or condition. It can be shown that the throughput optimal CQI distribution given a one-to-one correspondence between TBS and CQI value is a delta function, which is a generalized function on the real number line that is zero everywhere except at one and only one point. In one aspect of the disclosure, the delta function may be centered at zero, which is an optimal CQI value in this particular example. Therefore, in some aspects of the disclosure, the UE may report the same CQI (e.g., an optimal CQI or a fixed CQI) in channels with low temporal correlation to improve (e.g., maximize) channel throughput.

Given the temporally uncorrelated channel, the SNR is independent for each subframe (n), TBS ($m_i$) being a function of the SNR at subframe n−4, is independent of the current SNR γ. Therefore, the joint probability distribution $f_{\Lambda_{n-4}\Gamma_n}$ can be decoupled. In one example, it is assumed that maximum CQI/TBS index is M. Then, maximizing equation (3) is equivalent to an equation (4).

$$\max_{f_{\Lambda_{n-4}}} T = \frac{\sum_{i=1}^{M} E_\gamma[h(i, \gamma)] f_{\Lambda_{n-4}}(i)}{\sum_{i=1}^{M} E_\gamma[g(i, \gamma)] f_{\Lambda_{n-4}}(i)}, \quad (4)$$

where $E_\gamma$ is the expectation (expected value) with respect to γ. Because equation (4) is a linear-fractional program (a ratio of two linear functions), the optimal solution is deterministic. Accordingly, the UE can report the throughput optimizing CQI=i*, where i* can be determined by an equation (5).

$$i^* = \arg\max_i \frac{E_\gamma[h(i, \gamma)]}{E_\gamma[g(i, \gamma)]} \quad (5)$$

In some aspects of the disclosure, a UE may use a two-stage algorithm to determine and report i*, which is the CQI value that can improve (e.g., optimize or maximize) the throughput of a temporally uncorrelated channel. In some examples, a UE throughput improvement up to 80 percent may be achieved with the two-stage algorithm. Using linear-fractional programming (e.g., equation (4)), the throughput optimizing CQI may remain the same for a certain channel with low temporal correlation (or coherence) according to aspects of the present disclosure. In the two-stage algorithm, a UE computes a conditional throughput (based on equation (5)) and selects the CQI value corresponding to the best throughput in a training mode (e.g., a first CQI reporting mode), and reports the same selected CQI in a temporally uncorrelated channel (TUC) mode (e.g., a second CQI reporting mode). The two-stage algorithm will be described in more detail in reference to FIGS. 6-10.

Figure 6:
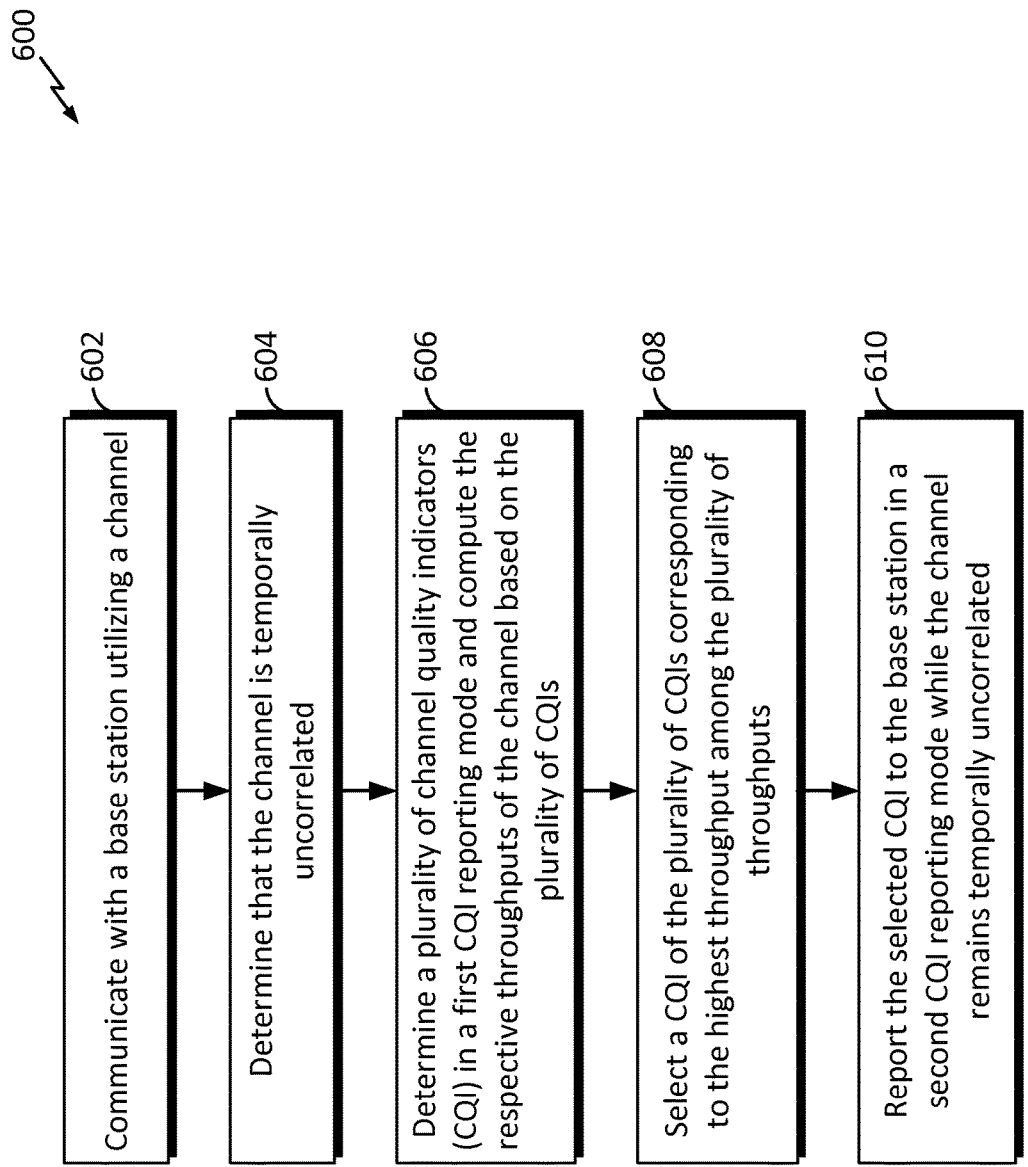
FIG. 6 is a flow diagram illustrating a channel quality reporting method in accordance with some aspects of the disclosure.

FIG. 6 is a flow diagram illustrating a channel quality reporting method 600 in accordance with some aspects of the disclosure. In some examples, the method 600 may be performed by any of the UEs illustrated in FIGS. 1-3 and/or 5, or any suitable device to improve channel throughput. At block 602, a UE communicates with a base station utilizing a channel. The UE may utilize a transceiver 110 (see FIG. 1) to communicate with a base station (e.g., a Node B) utilizing a physical channel (i.e., a propagation channel or a physical propagation path between the UE and the base station). In one particular example, the channel may be any HSDPA physical channel. At block 604, the UE may utilize a channel correlation block 122 (see FIG. 1) to determine that the channel is temporally uncorrelated. At block 606, the UE may utilize the CQI determination block 126 (see FIG. 1) to determine one or more CQIs in a first CQI reporting mode (e.g., a training mode 710 of FIG. 7) and compute the respective throughputs of the channel based on the CQIs. For example, the UE may utilize equations (3) and (4) to determine the throughputs of the channel.

At block 608, the UE may utilize the CQI selection block 128 (see FIG. 1) to select a CQI corresponding to the highest or best throughput among the plurality of throughputs. For example, the UE may utilize equation (5) to determine the CQI to be selected such that the throughput of a temporally uncorrelated channel may be improved (e.g., optimized or maximized). At block 610, the UE may report the selected CQI to the base station in a second CQI reporting mode (e.g., a TUC mode 712 of FIG. 7) while the channel remains temporally uncorrelated. In the second mode, the UE may determine whether or not the channel remains temporally uncorrelated at a suitable time before reporting the selected CQI to the base station.

Figure 7:
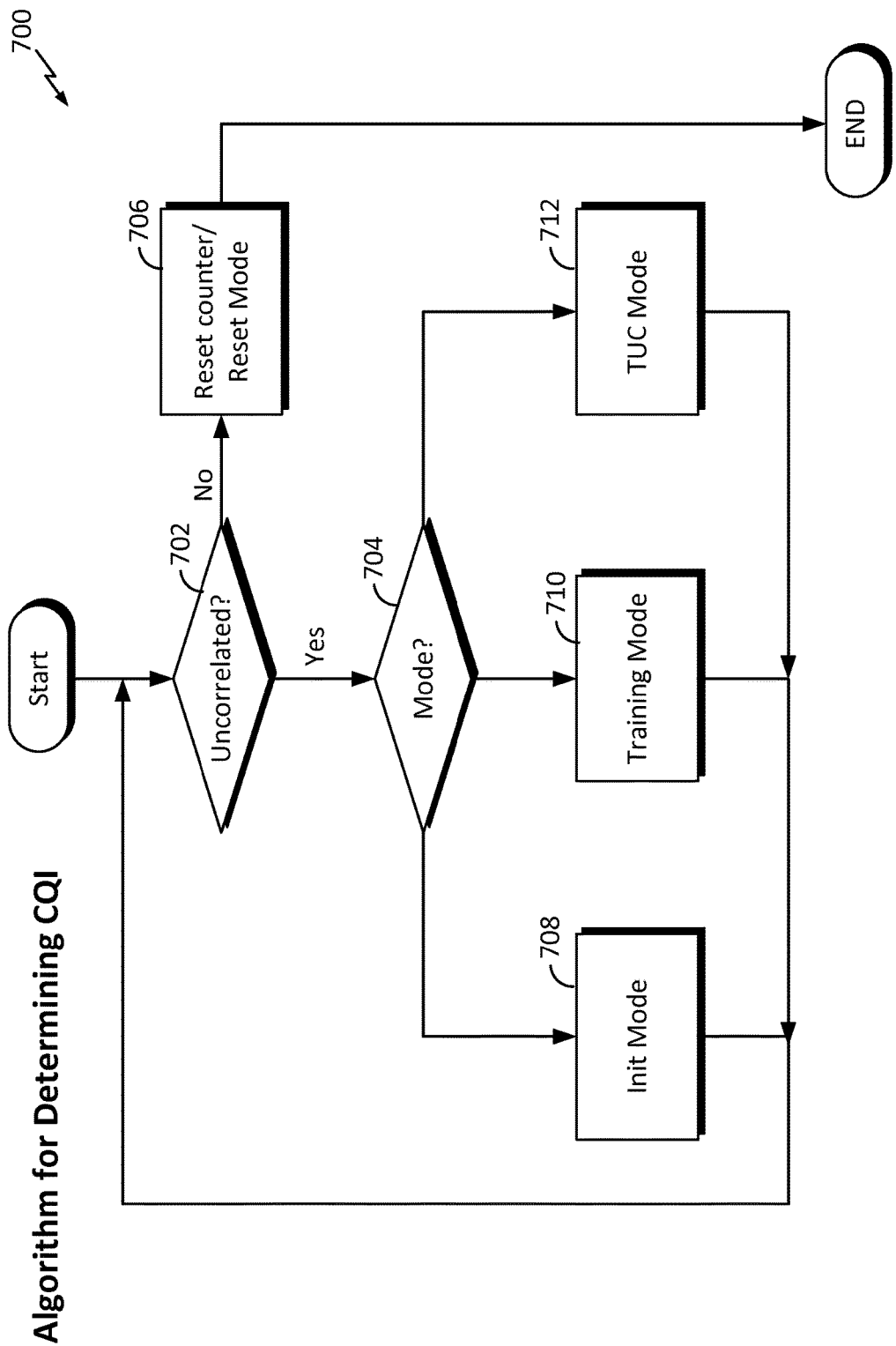
FIG. 7 is a flow diagram illustrating a two-stage algorithm for determining a CQI value that can improve data throughput in a communication channel in accordance with some aspects of the disclosure.

FIG. 7 is a flow diagram illustrating a two-stage CQI reporting algorithm 700 for determining a CQI value that can improve (e.g., optimize or maximize) data throughput in a communication channel in accordance with some aspects of the disclosure. In some examples, the algorithm 700 may be performed by any of the UEs illustrated in FIGS. 1-3 and/or 5, or any suitable device. Before the start of the algorithm 700, it may be assumed that a UE starts a call (voice or data call) with a Node B using one or more channels (e.g., HS-DSCH, HS-SCCH, and/or HS-DPCCH). In one particular example, the UE may be the UE 100 of FIG. 1. At decision block 702, the UE may utilize the channel correlation block 122 to determine whether or not the channel is temporally uncorrelated. For the purpose of determining channel correlation or autocorrelation, the channel is a physical channel (i.e., a propagation channel or a physical propagation path) between the Node B and UE. In one aspect of the disclosure, the temporal correlation of the channel may be estimated using Pearson's correlation coefficient ρ of the SNR of the channel as defined in equation (6):

$$\rho(\gamma_n, \gamma_{n-4}) = \frac{\text{cov}(\gamma_n, \gamma_{n-4})}{\sigma_{\gamma_n} \sigma_{\gamma_{n-4}}}, \quad (6)$$

where coy is the covariance, $\sigma_{\gamma_n}$ and $\sigma_{\gamma_{n-4}}$ are the standard deviations of $\gamma_n$ and $\gamma_{n-4}$. After the coefficient ρ is computed, it is compared to a suitable threshold. If the coefficient ρ is less than the threshold, the channel may be considered as temporally uncorrelated. In some examples, the threshold can be any suitable value between +1 and −1. In one particular example, the threshold can have a value of 0.4.

Figure 8:
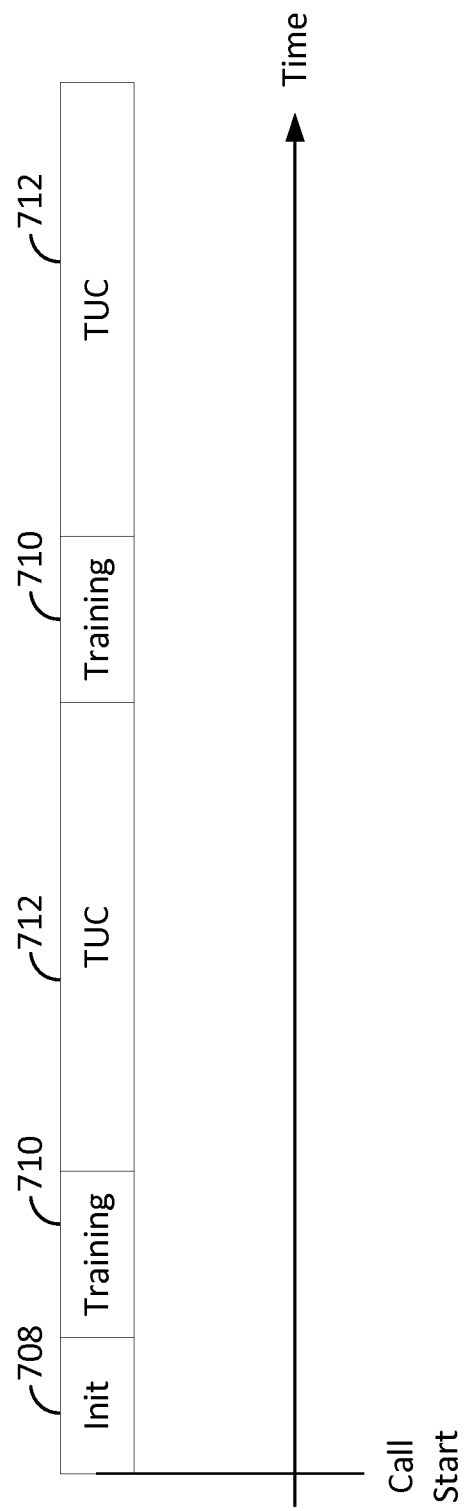
FIG. 8 is a drawing illustrating an exemplary temporal sequence of three CQI reporting modes utilized by a UE in accordance with an aspect of the disclosure.

If it is determined that the channel is temporally uncorrelated, the algorithm 700 proceeds to block 704; otherwise, the algorithm 700 proceeds to block 706. At decision block 704, the UE can utilize the mode selection block 124 to determine one of three CQI reporting modes including an initialization (init) mode 708, a training mode 710, and a temporally uncorrelated channel (TUC) mode 712. FIG. 8 is a drawing illustrating an example of a time sequence of the three CQI reporting modes utilized by a UE in accordance with an aspect of the disclosure. In FIG. 8, the init mode 708 may be activated at the beginning of a call. During the init mode 708, the UE initializes various resources and variables (e.g., a counter and a mode variable) that may be utilized during the call. The UE may utilize a CQI determination block 126 (see FIG. 1) to measure an initial CQI distribution and determine an initial conditional throughput of the reported CQIs. After the init mode 708, in the next iteration of the algorithm 700, the UE may enter the training mode 710.

During the training mode 710, the UE reports the CQI as measured and computes the corresponding throughput, for example, using equation (3). For more information on CQI measurement and reporting, for example, 3GPP TS 25.214 provides detailed information on CQI measurement. In one aspect of the disclosure, the UE reports the highest CQI value for which a single HS-DSCH sub-frame, could be received with a transport block error probability not exceeding 0.1 in a 3-slot CQI reference period ending 1 slot before the start of the first slot in which the reported CQI value is transmitted. Such single HS-DSCH sub-frame may be formatted with the transport block size, the number of HS-PDSCH codes, and the modulation corresponding to the reported or lower CQI value.

The UE may go through multiple cycles of measuring CQI, determining the corresponding throughput, and reporting the CQI using the training mode 710 until a certain CQI value with the desired corresponding throughput is determined. At the end of the training mode 710, the UE selects the CQI i* corresponding to the best or highest throughput determined during the training mode 710. In the next iteration of the algorithm 700, the UE enters the TUC mode 712. In the TUC mode 712, the UE may report the same CQI i* (i.e., a fixed CQI or a throughput optimizing CQI) while the UE remains in this mode (i.e., the physical channel remains temporally uncorrelated). The UE may exit the TUC mode 712 and go back to the training mode 710, for example, by timer expiration and/or other metrics (e.g., a throughput metric). In one exemplary throughput metric, if the channel throughput during the TUC mode 712 is lower than the training mode throughput estimate by 3% or more, then the UE may exit the TUC mode 712. The UE may maintain a counter 134 and/or a mode variable 136. The counter may be used as a timer to determine when to exit any of the modes. The mode variable may be used to keep track of the current mode of the UE. For example, the mode variable may be set to 1, 2, and 3, respectively, to represent the init mode 708, training mode 710, and TUC mode 712. At block 706, the UE resets the counter and mode variable. For example, the counter and mode variable may be reset to zeros or any predetermined values.

Figure 9:
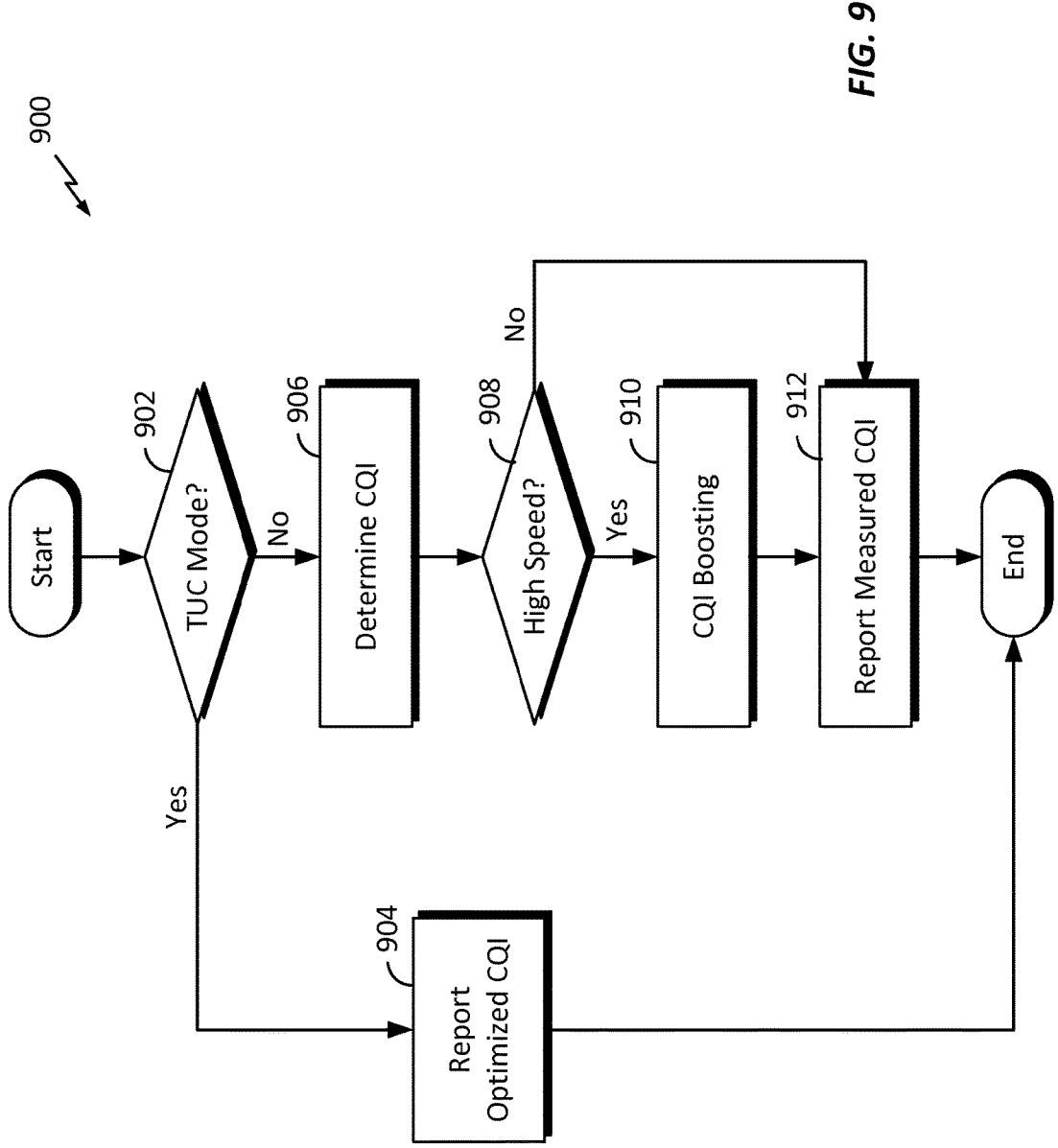
FIG. 9 is a flow diagram illustrating a CQI reporting method in accordance with an aspect of the disclosure.

FIG. 9 is a flow diagram illustrating a CQI reporting method 900 in accordance with an aspect of the disclosure. The CQI reporting method 900 may be performed by any of the UEs illustrated in FIGS. 1-3 and/or 5, or any suitable device. In one aspect of the disclosure, the CQI reporting method 900 may be utilized to report CQI at blocks 708, 710, and/or 712 of FIG. 7. At decision block 902, it is determined whether or not the UE is in the TUC mode 712. If the UE is in the TUC mode 712, the method 900 proceeds to block 904; otherwise, the UE may be in the init mode 708 or training mode 710, and the method 900 proceeds to block 906. At block 904, the UE reports the same CQI (e.g., optimized CQI i*) that can optimize or increase the throughput of a temporally uncorrelated channel. At block 906, the UE determines the current CQI using a suitable method. For example, the UE may determine the CQI based on a signal-to-noise ratio (SNR), a signal-to-interference plus noise ratio (SINR), and a signal-to-noise plus distortion ratio (SNDR). In one example, the UE may measure CQI in accordance with 3GPP TS 25.214 for CQI measurement, which is incorporated herein by reference.

As defined in 3GPP TS 25.214, for the purpose of CQI reporting, the UE assumes a total received HS-PDSCH power of $$P_{HSPDSCH} = P_{CPICH} + \Gamma + \Delta \text{ in dB,}$$

where the total received power is evenly distributed among the HS-PDSCH codes of the reported CQI value. The measurement power offset Γ is signaled by higher layers and the reference power adjustment Δ is dependent on the UE category.

At decision block 908, it is determined whether or not the UE is moving at a high rate of speed by utilizing the speed sensor 140. In one example, the UE may be considered to be moving in high speed if it is moving faster than 30 kilometers per hour or any predetermined speed. If the UE is moving in high speed, the method 900 proceeds to block 910. At block 910, the UE may utilize the CQI boosting block 130 (see FIG. 1) to boost the reported CQI value. The CQI may be boosted by a suitable offset (e.g., an empirical offset) In one example, the CQI may be boosted by 2 dB in any of the three modes (i.e., init mode, training mode, and TUC mode) under high speed scenarios. In some examples, the speed of the UE may be detected using a Doppler estimator, a speed sensor 140, or any suitable method. In some examples, the CQI boost offset may be adaptive (e.g., dynamically adjusted based on the speed of the UE). At block 912, the UE reports the measured CQI to the network (e.g., Node B).

Figure 10:
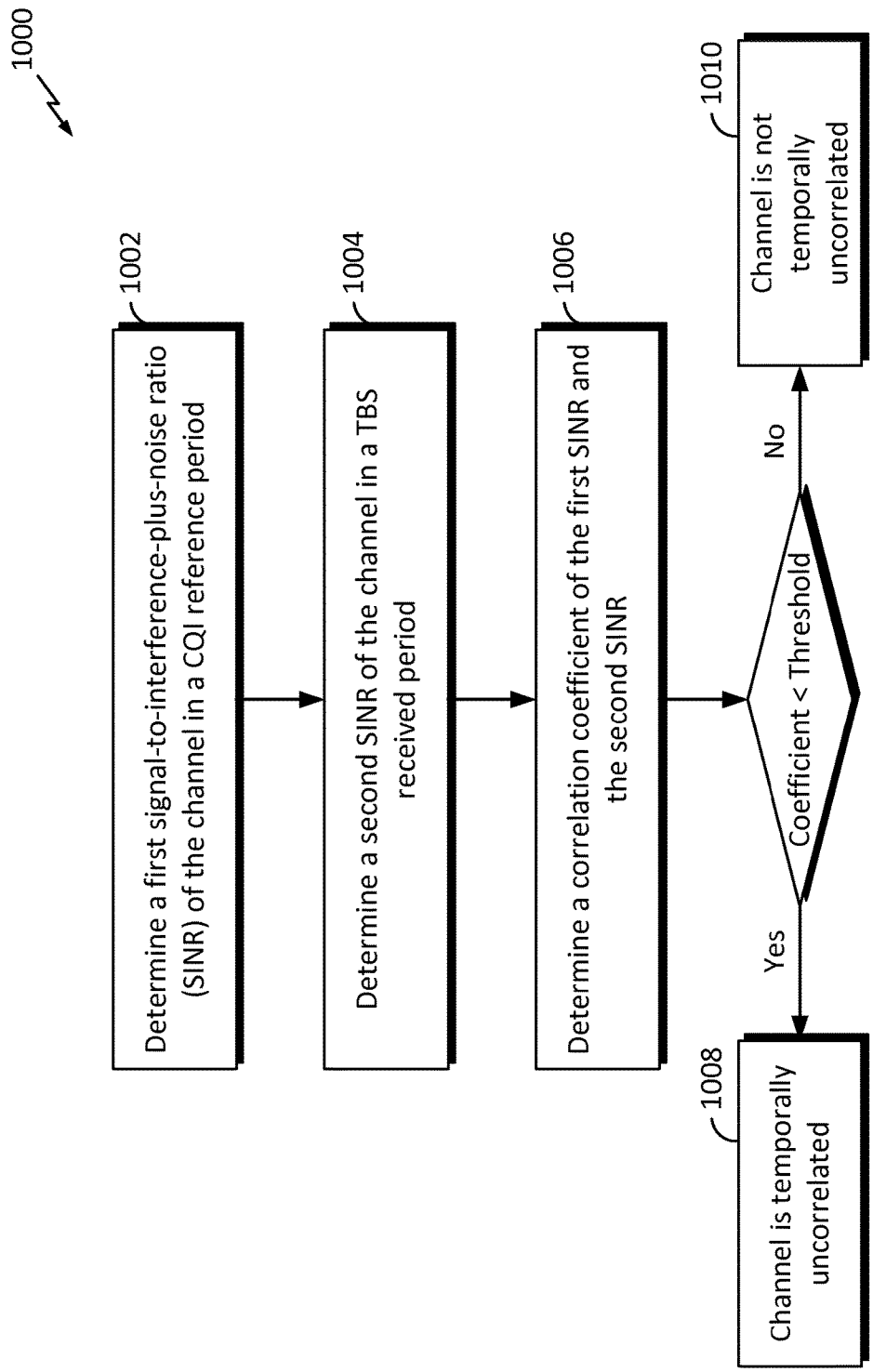
FIG. 10 is a flow diagram illustrating a channel temporal correlation determining method in accordance with an aspect of the disclosure.

FIG. 10 is a flow diagram illustrating a channel temporal correlation determining method 1000 in accordance with an aspect of the disclosure. The channel temporal correlation determining method 1000 may be performed by any of the UEs illustrated in FIGS. 1-3 and/or 5, or any suitable device. In one specific example, a UE may utilize the channel correlation block 122 to perform the method 1000 in order to determine whether or not a channel is temporally uncorrelated. This method may be utilized in block 604 of FIG. 6 and block 702 of FIG. 7. At block 1002, the UE determines a first signal-to-interference-plus-noise ratio (SINR) of the channel in a CQI reference period. At block 1004, the UE determines a second SINR of the channel in a TBS received period. At block 1006, the UE determines a correlation coefficient of the first SINR and the second SINR. For example, the correlation coefficient may be the Pearson's correlation coefficient $\rho$ as defined by equation (6). If the correlation coefficient is less than a predetermined threshold (e.g., the threshold is equal to 0.4), the UE determines that the channel is temporally uncorrelated in block 1008; otherwise, the UE determines that the channel is not temporally uncorrelated in block 1010.

In some aspects of the disclosure, a base station (e.g., Node B) may utilize the above-described methodology to determine a TBS that can optimize downlink throughput of a channel. In some examples, the channels may be HSPA channels such as high speed downlink packet access (HSDPA) channels. In HSDPA, a Node B assigns transport block size (TBS), number of codes and modulation to a UE, according to the UE reported CQI. However, the present disclosure may be applied to other suitable wireless channels in the same or different standards.

In various aspects of the disclosure, a downlink throughput enhancing TBS reporting scheme is disclosed for both static communication channels and rapidly varying communication channels (e.g., HS channels). In this throughput enhancing TBS reporting scheme, the throughput for HS channels (e.g., HSDPA channels) can be improved (e.g., optimized or maximized) by transmitting a TBS with a certain value (e.g., a fixed value) irrespective of the current state of the channel under certain conditions. In some aspects of the disclosure, the time or temporal correlation of the channels may be used as a metric or condition to classify or qualify the channels for throughput enhancing TBS reporting apart from the other channels where such TBS reporting scheme may not be suitable. Some aspects of the disclosure also provide a two-stage algorithm that may improve channel throughput with a TBS reporting mechanism that identifies the throughput enhancing TBS value in real time.

Figure 11:
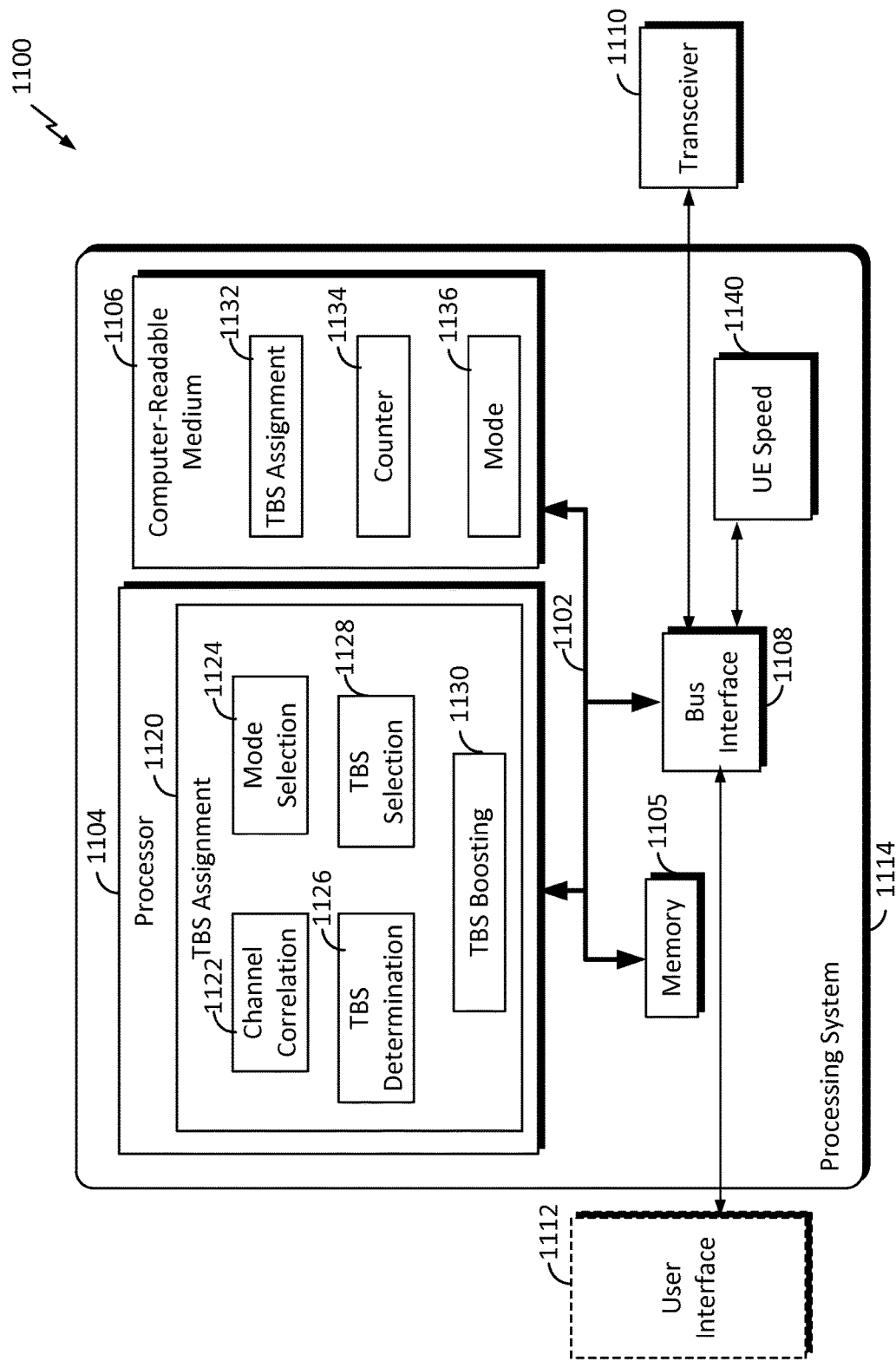
FIG. 11 is a conceptual diagram illustrating an example of a hardware implementation for an apparatus employing a processing system according to aspects of the disclosure.

FIG. 11 is a conceptual diagram illustrating an example of a hardware implementation for an apparatus 1100 employing a processing system 1114. In accordance with various aspects of the disclosure, an element, or any portion of an element, or any combination of elements may be implemented with a processing system 1114 that includes one or more processors 1104. For example, the apparatus 1100 may be a Node B as illustrated in any one or more of FIGS. 2, 3, and/or 5. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. For example, the processor 1104, as utilized in an apparatus 1100, may be used to implement any one or more of the processes and functions described below and illustrated in FIGS. 12-14.

In this example, the processing system 1114 may be implemented with a bus architecture, represented generally by a bus 1102. The bus 1102 may include any number of interconnecting buses and bridges depending on the specific application of the processing system 1114 and the overall design constraints. The bus 1102 links together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 (a communication interface) provides a means for communicating with various other apparatus over a transmission medium. Depending upon the nature of the apparatus, a user interface 1112 (e.g., keypad, display, speaker, microphone, joystick, touchscreen, touchpad, gesture sensor) may also be provided.

The processor 1104 includes a TBS assignment block 1120 that can be configured to perform various TBS assignment functions and procedures described below in relation to FIGS. 12-14. In one aspect of the disclosure, the TBS assignment block 1120 includes one or more components including a channel correlation block 1122, a mode selection block 1124, a TBS determination block 1126, a TBS selection block 1128, and a TBS boosting block 1130. The channel correlation block 1122 may be utilized to determine a temporal correlation of a channel. The mode selection block 1124 may be utilized to select different TBS assignment modes supported by the apparatus. The TBS determination block 1126 may be utilized to determine a TBS of a channel. The TBS selection block 1128 may be utilized to select and assign a TBS value to improve (e.g., maximize or optimize) the throughput of a channel (e.g., a temporally uncorrelated channel). The TBS boosting block 1130 may be utilized to boost or increase the TBS by a predetermined or adaptive value under certain conditions. The TBS assignment block 1120 and its various components will be described in more detail below in reference to FIGS. 12-14.

The processor 1104 is also responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 may also be used for storing data that is manipulated by the processor 1104 when executing software.

In one aspect of the disclosure, the software may include a TBS assignment code 1132 when executed by the processor 1104, can configure the processor 1104 (e.g., TBS assignment block 1120) to perform various functions including the TBS assignment functions described below in reference to FIGS. 12-14. The computer-readable medium 1106 may be used to store a counter variable 1134 and a mode variable 1136, which may be utilized in TBS assignment related functions and will be described in more detail below.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 12:
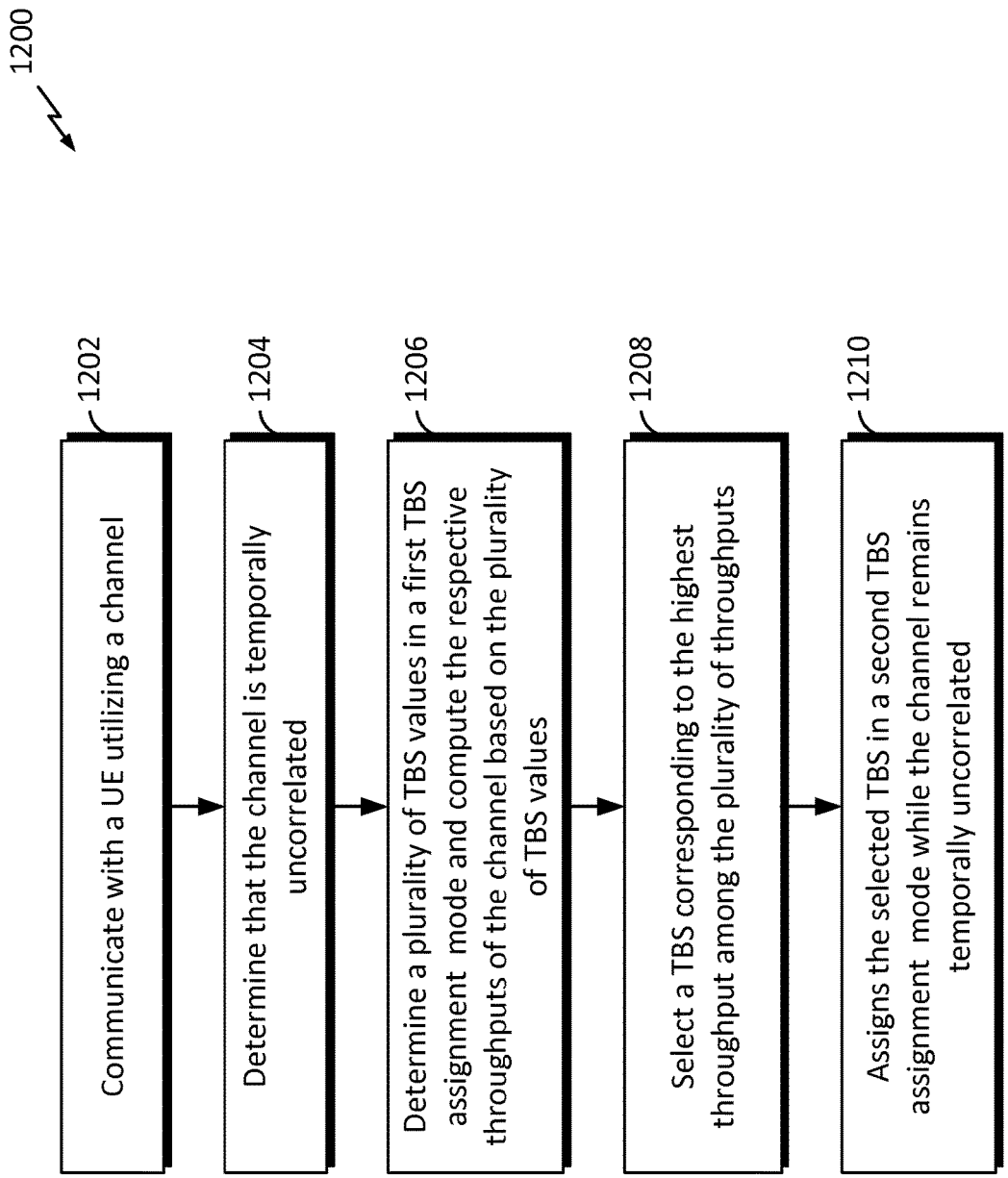
FIG. 12 is a flow diagram illustrating a TBS assignment method in accordance with some aspects of the disclosure.
Figure 13:
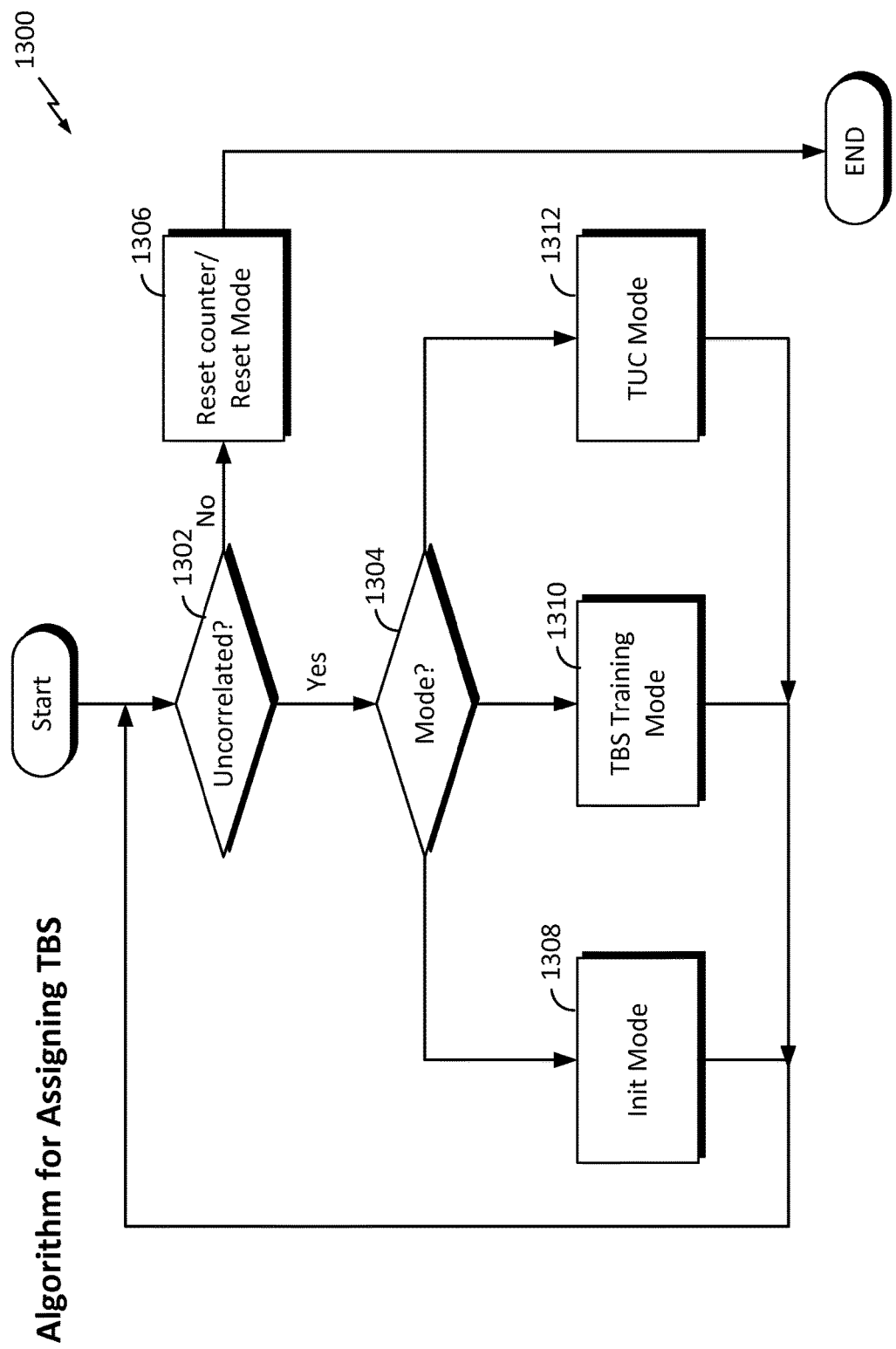
FIG. 13 is a flow diagram illustrating a two-stage algorithm for determining a TBS value that can improve data throughput in a communication channel in accordance with some aspects of the disclosure.
Figure 14:
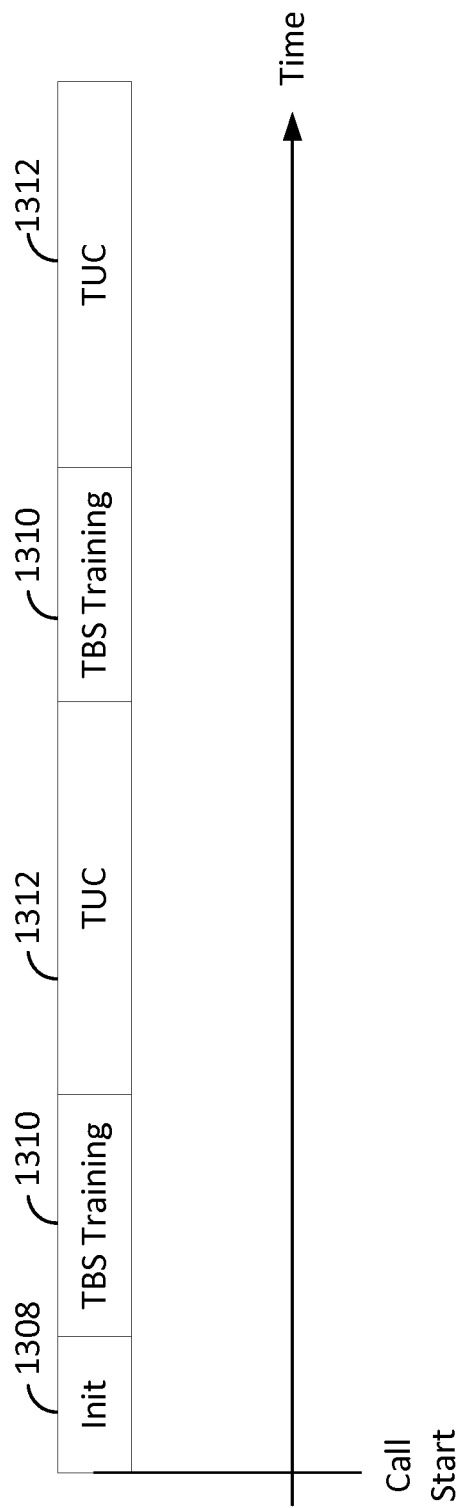
FIG. 14 is a drawing illustrating an exemplary temporal sequence of three TBS assignment modes utilized by a Node B in accordance with an aspect of the disclosure.

The circuitry, components, or blocks of the apparatus 1100 are merely provided as an example, and other means for carrying out the described functions, algorithms, and procedures of FIGS. 12-14 may be included within various aspects of the present disclosure, including but not limited to the instructions stored in the computer-readable storage medium 1106, or any other suitable apparatus or means described in any one of the FIGS. 1-3 and/or 5 and utilizing, for example, the processes and/or algorithms described herein in relation to FIGS. 6-10.

In one example, it is assumed that the maximum number of retransmissions is K for a certain channel. The BLER for the $k^{th}$ transmission of TBS $m_i$ is denoted as $B_k(m_i)$, where i is the TBS index (or TBS value). Let γ be the current SNR. The "net" number of TBS successfully decoded can be modelled by an equation (7).

$$h(i,\gamma) = m_i(1 - B_K(m_i,\gamma)) \qquad (7)$$

The number of subframes transmitted is given by an equation (8).

$$g(i,\gamma) = \Sigma_{k=1}^{K} k(B_{k-1}(m_i,\gamma) - B_k(m_i,\gamma)) + KB_K(m_i,\gamma) \qquad (8)$$

The total number of time used for transmission is proportional to the number of subframes. For example, in HSDPA, each subframe is 2 ms. Therefore, the UE throughput can be defined by an equation (9).

$$T = \frac{\int_0^\infty \sum_{i=1}^M h(i,\gamma) f_{\Lambda_{n-4}\Gamma_n}(i,\gamma) d\gamma}{\int_0^\infty \sum_{i=1}^M g(i,\gamma) f_{\Lambda_{n-4}\Gamma_n}(i,\gamma) d\gamma}, \qquad (9)$$

where $\Lambda_{n-4}$ is the CQI index reported to Node B at subframe n−4, $\Gamma_n$ is the SNR at subframe n, M is the maximum TBS index, and $f_{\Lambda_{n-4}\Gamma_n}$ is the joint probability distribution of $\Lambda_{n-4}$ and $\Gamma_n$. In one example, the TBS index may be valued from 0 to 30.

In some aspects of the present disclosure, a method is provided for determining the TBS value (e.g., an optimal TBS) that can maximize equation (9) (i.e., maximizing UE throughput), given the channel has a low temporal correlation (e.g., temporally uncorrelated). A channel may be considered temporally uncorrelated when the SINR of the channel in the CQI reference period and that of the channel during a TBS received period, are substantially un-correlated. The TBS received period is the time slot when the TBS corresponding to the previously reported CQI is received at the UE.

Given the temporally uncorrelated channel, the SNR is independent for each subframe (n), TBS ($m_i$) being a function of the SNR at subframe n−4, is independent of the current SNR γ. Therefore, the joint probability distribution $f_{\Lambda_{n-4}\Gamma_n}$ can be decoupled. In one example, it is assumed that maximum TBS index is M. Then, maximizing equation (9) is equivalent to an equation (10).

$$\max_{f_{\Lambda_{n-4}}} T = \frac{\sum_{i=1}^M E_\gamma[h(i,\gamma)] f_{\Lambda_{n-4}}(i)}{\sum_{i=1}^M E_\gamma[g(i,\gamma)] f_{\Lambda_{n-4}}(i)}, \qquad (10)$$

where $E_\gamma$ is the expectation (expected value) with respect to γ. Because equation (4) is a linear-fractional program (a ratio of two linear functions), the optimal solution is deterministic. Accordingly, the Node B can assign the throughput optimizing TBS=i*, where i* can be determined by an equation (11).

$$i^* = \arg\max_i \frac{E_\gamma[h(i,\gamma)]}{E_\gamma[g(i,\gamma)]} \qquad (11)$$

In some aspects of the disclosure, a Node B may use a two-stage algorithm to determine and report i*, which is the TBS value that can improve (e.g., optimize or maximize) the throughput of a temporally uncorrelated channel. Using linear-fractional programming (e.g., equation (10)), the throughput optimizing TBS may remain the same for a certain channel with low temporal correlation (or coherence) according to aspects of the present disclosure. In the two-stage algorithm, a Node B computes a conditional throughput (based on equation (11)) in a training mode (e.g., a first TBS assignment mode). The Node B selects the TBS value corresponding to the best throughput in the training mode, and utilizes the same TBS in a temporally uncorrelated channel (TUC) mode (e.g., a second TBS assignment mode). The two-stage algorithm will be described in more detail in reference to FIGS. 12-14.

FIG. 12 is a flow diagram illustrating a TBS assignment method 1200 in accordance with some aspects of the disclosure. In some examples, the method 1200 may be performed by any of the Node Bs illustrated in FIGS. 2, 3, 5, and/or 11, or any suitable device to improve channel throughput. At block 1202, a Node B communicates with a UE utilizing a channel. The Node B may utilize a transceiver 1110 (see FIG. 11) to communicate with the UE utilizing a physical channel (i.e., a propagation channel or a physical propagation path between the UE and the Node B). In one particular example, the channel may be any HSDPA physical channel. At block 1204, the Node B may utilize a channel correlation block 1122 (see FIG. 11) to determine that the channel is temporally uncorrelated. For example, the Node B may utilize a method similar to the method 1000 of FIG. 10 to determine a temporal correlation or autocorrelation of the channel. At block 1206, the Node B may utilize the TBS determination block 1126 (see FIG. 11) to determine one or more TBS values in a first TBS assignment mode (e.g., a TBS training mode 1310 of FIG. 13) and compute the respective throughputs of the channel for each TBS value. For example, the Node B may utilize equations (10) and (11) to determine the throughputs of the channel.

At block 1208, the Node B may utilize the TBS selection block 1128 (see FIG. 11) to select a TBS corresponding to the highest or best throughput among the plurality of throughputs. For example, the Node B may utilize equation (11) to determine the TBS to be selected such that the throughput of a temporally uncorrelated channel may be improved (e.g., optimized or maximized). At block 1210, the UE may assign the selected TBS to the channel in a second TBS assignment mode (e.g., a TUC mode 1312 of FIG. 13) while the channel remains temporally uncorrelated. In the second TBS assignment mode, the Node B may determine whether or not the channel remains temporally uncorrelated at a suitable time before assigning the TBS.

FIG. 13 is a flow diagram illustrating a two-stage TBS assignment algorithm 1300 for determining a TBS value that can improve (e.g., optimize or maximize) data throughput in a communication channel in accordance with some aspects of the disclosure. In some examples, the algorithm 1300 may be performed by any of the Node Bs illustrated in FIGS. 2, 3, 5 and/or 11, or any suitable device. Before the start of the algorithm 1300, it may be assumed that a UE starts a call (voice or data call) with the Node B using one or more channels (e.g., HS-DSCH, HS-SCCH, and/or HS-DPCCH). In one particular example, the Node B may be the Node B 1100 of FIG. 11. At decision block 1102, the Node B may utilize the channel correlation block 1122 to determine whether or not the channel is temporally uncorrelated. For the purpose of determining channel correlation or autocorrelation, the channel is a physical channel (i.e., a propagation channel or a physical propagation path) between the Node B and UE. In one aspect of the disclosure, the temporal correlation of the channel may be estimated using Pearson's correlation coefficient $\rho$ of the SNR of the channel as defined in equation (12):

$$\rho(CQI_n, CQI_{n-4}) = \frac{\text{cov}(CQI_n, CQI_{n-4})}{\sigma_{CQI_n} \sigma_{CQI_{n-4}}}, \quad (12)$$

where coy is the covariance, $\sigma_{CQI_n}$ and $\sigma_{CQI_{n-4}}$ are the standard deviations of, $CQI_n$ and $cQI_{n-4}$. After the coefficient $\rho$ is computed, it is compared to a suitable threshold. If the coefficient $\rho$ is less than the threshold, the channel may be considered as temporally uncorrelated. In some examples, the threshold can be any suitable value between +1 and −1. In one particular example, the threshold can have a value of 0.4.

If it is determined that the channel is temporally uncorrelated, the algorithm 1300 proceeds to block 1304; otherwise, the algorithm 1300 proceeds to block 1306. At decision block 1304, the UE can utilize the mode selection block 1124 to determine one of three TBS assignment modes including an initialization (init) mode 1308, a training mode 1310, and a temporally uncorrelated channel (TUC) mode 1312. FIG. 14 is a drawing illustrating an example of a time sequence of the three TBS assignment modes utilized by a Node B in accordance with an aspect of the disclosure. In FIG. 14, the init mode 1408 may be activated at the beginning of a call. During the init mode 1408, the Node B initializes various resources and variables (e.g., a counter and a mode variable) that may be utilized during the call. The Node B may utilize a TBS determination block 1126 (see FIG. 11) to measure an initial TBS distribution and determine an initial conditional throughput of the assigned TBS. After the init mode 1408, in the next iteration of the algorithm 1300, the Node B may enter the TBS training mode 1410.

During the TBS training mode 1410, the Node B assigns various TBS values and computes the corresponding throughput, for example, using equation (9). The Node B may go through multiple cycles of selecting a TBS value and determining the corresponding throughput using the TBS training mode 1410 until a certain TBS value with the desired corresponding throughput is determined. At the end of the TBS training mode 1410, the Node B selects the TBS value (i*) corresponding to the best or highest throughput determined during the TBS training mode 1410. In the next iteration of the algorithm 1300, the Node B enters the TUC mode 1412. In the TUC mode 1412, the Node B may assign the same TBS i* (i.e., a fixed TBS or a throughput optimizing TBS) while the Node B remains in this mode (i.e., the physical channel remains temporally uncorrelated). The Node B may exit the TUC mode 1412 and go back to the training mode 1410, for example, by timer expiration and/or other metrics (e.g., a throughput metric). In one exemplary throughput metric, if the channel throughput during the TUC mode 1412 is lower than the training mode throughput estimate by 3% or more, then the Node B may exit the TUC mode 1412. The Node B may maintain a counter 1134 and/or a mode variable 1136. The counter may be used as a timer to determine when to exit any of the modes. The mode variable may be used to keep track of the current mode of the Node B. For example, the mode variable may be set to 1, 2, and 3, respectively, to represent the init mode 1408, training mode 1410, and TUC mode 1412. At block 1306, the Node B resets the counter and mode variable. For example, the counter and mode variable may be reset to zeros or any predetermined values.

In some aspects of the disclosure, the Node B may boost the TBS value by a certain offset in all three modes of FIG. 14 when the UE is moving at a high rate of speed. In one example, the UE may be considered to be moving in high speed if it is moving faster than 30 kilometers per hour or any predetermined speed. If the UE is moving in high speed, the Node B may utilize the TBS boosting block 1130 (see FIG. 11) to boost the TBS value by a suitable offset (e.g., an empirical offset). In some examples, the speed of the UE may be detected using a Doppler estimator, a speed sensor 140, or any suitable method. In some examples, the TBS boost offset may be adaptive (e.g., dynamically adjusted based on the speed of the UE). In some aspects of the disclosure, the Node B may detect the speed of the UE by measuring the CQI variance.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-3, 5 and 11 may be configured to perform one or more of the methods, features, or steps described herein. The various components or blocks of the apparatus illustrated in FIGS. 1-3, 5 and 11 may be implemented in software, hardware, firmware, or a combination thereof. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of reporting channel quality operable at a user equipment (UE), comprising:
    communicating with a base station utilizing a channel;
    determining that the channel is temporally uncorrelated;
    when the channel is temporally uncorrelated:
        in a first CQI reporting mode, determining a plurality of channel quality indicators (CQIs) and computing the respective throughputs of the channel based on the plurality of CQIs;
        in the first CQI reporting mode, selecting a CQI of the plurality of CQIs corresponding to the highest throughput among the plurality of throughputs; and
        in a second CQI reporting mode, reporting the selected CQI that remains the same during the second CQI reporting mode to the base station while the channel remains temporally uncorrelated.

2. The method of claim 1, wherein the determining that the channel is temporally uncorrelated, comprises:
    determining a first signal-to-interference-plus-noise ratio (SINR) of the channel in a CQI reference period;
    determining a second SINR of the channel in a transport block size (TBS) received period; and
    if a correlation coefficient of the first SINR and the second SINR is less than a threshold, determining that the channel is temporally uncorrelated.

3. The method of claim 1, further comprising:
    if the UE is moving at a speed higher than a threshold, increasing the reported CQI.

4. The method of claim 1, wherein the throughput is determined by a first equation defined as:

$$\frac{\int_0^\infty \sum_{i=1}^M h(i,\gamma) f_{\Lambda_{n-4}\Gamma_n}(i,\gamma) d\gamma}{\int_0^\infty \sum_{i=1}^M g(i,\gamma) f_{\Lambda_{n-4}\Gamma_n}(i,\gamma) d\gamma},$$

where $\Lambda_{n-4}$ is a CQI reported at subframe n-4, $\Gamma_n$ is a signal-to-noise ratio (SNR) at subframe n, M is a maximum CQI or transport block size (TBS) index, and $f\Lambda_{n-4}\Gamma_n$ is a joint probability distribution of $\Lambda_{n-4}$ and $\Gamma_n$.

5. The method of claim 4, wherein the selecting the CQI comprises:

maximizing the first equation; and
selecting the CQI among the plurality of CQIs corresponding to the maximized first equation.

6. The method of claim 1, wherein the channel comprises a physical propagation path between the base station and the UE.

7. A user equipment (UE) configured to report channel quality in a wireless communication network, comprising:
means for communicating with a base station utilizing a channel;
means for determining that the channel is temporally uncorrelated;
when the channel is temporally uncorrelated:
means for, in a first CQI reporting mode, determining a plurality of channel quality indicators (CQIs) and computing the respective throughputs of the channel based on the plurality of CQIs;
means for, in the first CQI reporting mode, selecting a CQI of the plurality of CQIs corresponding to the highest throughput among the plurality of throughputs; and
means for, in a second CQI reporting mode, reporting the selected CQI that remains the same during the second CQI reporting mode to the base station while the channel remains temporally uncorrelated.

8. The user equipment of claim 7, wherein the means for determining that the channel is temporally uncorrelated, is configured to:
determine a first signal-to-interference-plus-noise ratio (SINR) of the channel in a CQI reference period;
determine a second SINR of the channel in a transport block size (TBS) received period; and
if a correlation coefficient of the first SINR and the second SINR is less than a threshold, determine that the channel is temporally uncorrelated.

9. The user equipment of claim 7, further comprising:
means for if the UE is moving at a speed higher than a threshold, increasing the reported CQI.

10. The user equipment of claim 7, wherein the throughput is determined by a first equation defined as:

$$\frac{\int_0^\infty \sum_{i=1}^M h(i,\gamma)f_{\Lambda_{n-4}\Gamma_n}(i,\gamma)d\gamma}{\int_0^\infty \sum_{i=1}^M g(i,\gamma)f_{\Lambda_{n-4}\Gamma_n}(i,\gamma)d\gamma},$$

where $\Lambda_{n-4}$ is a CQI reported at subframe n–4, $\Gamma_n$ is a signal-to-noise ratio (SNR) at subframe n, M is a maximum CQI or transport block size (TBS) index, and $f\Lambda_{n-4}\Gamma_n$ is a joint probability distribution of $\Lambda_{n-4}$ and $\Gamma_n$.

11. The user equipment of claim 10, wherein the means for selecting the CQI is configured to:
maximize the first equation; and
select the CQI among the plurality of CQIs corresponding to the maximized first equation.

12. The user equipment of claim 7, wherein the channel comprises a physical propagation path between the base station and the UE.

13. A user equipment (UE) configured to report channel quality in a wireless communication network, comprising:
a memory comprising a channel quality reporting code;
a communication interface configured to communicate with a base station utilizing a channel; and
at least one processor operatively coupled with the memory and the communication interface,
wherein the at least one processor is configured by the channel quality reporting code to:
determine that the channel is temporally uncorrelated;
when the channel is temporally uncorrelated:
in a first CQI reporting mode, measure a plurality of channel quality indicators (CQIs) compute the respective throughputs of the channel based on the plurality of CQIs; and
in the first CQI reporting mode, select a CQI of the plurality of CQIs corresponding to the highest throughput among the plurality of throughputs; and
in a second CQI reporting mode, report the selected CQI that remains the same during the second CQI reporting mode to the base station while the channel remains temporally uncorrelated.

14. The user equipment of claim 13, wherein the at least one processor is further configured to:
determine a first signal-to-interference-plus-noise ratio (SINR) of the channel in a CQI reference period;
determine a second SINR of the channel in a transport block size (TBS) received period; and
if a correlation coefficient of the first SINR and the second SINR is less than a threshold, determine that the channel is temporally uncorrelated.

15. The user equipment of claim 13, wherein the at least one processor is further configured to:
if the UE is moving at a speed higher than a threshold, increase the reported CQI.

16. The user equipment of claim 13, wherein the throughput is determined by a first equation defined as:

$$\frac{\int_0^\infty \sum_{i=1}^M h(i,\gamma)f_{\Lambda_{n-4}\Gamma_n}(i,\gamma)d\gamma}{\int_0^\infty \sum_{i=1}^M g(i,\gamma)f_{\Lambda_{n-4}\Gamma_n}(i,\gamma)d\gamma},$$

where $\Lambda_{n-4}$ is a CQI reported at subframe n–4, $\Gamma_n$ is a signal-to-noise ratio (SNR) at subframe n, M is a maximum CQI or transport block size (TBS) index, and $f\Lambda_{n-4}\Gamma_n$ is a joint probability distribution of $\Lambda_{n-4}$ and $\Gamma_n$.

17. The user equipment of claim 16, wherein the at least one processor is further configured to:
maximize the first equation; and
select the CQI among the plurality of CQIs corresponding to the maximized first equation.

18. The user equipment of claim 13, wherein the channel comprises a physical propagation path between the base station and the UE.

19. A non-transitory computer-readable storage medium comprising channel quality indicator (CQI) reporting code for causing a user equipment (UE) to:
communicate with a base station utilizing a channel;
determine that the channel is temporally uncorrelated;
when the channel is temporally uncorrelated:
in a first CQI reporting mode, determine a plurality of channel quality indicators (CQIs) and compute the respective throughputs of the channel based on the plurality of CQIs;
in the first CQI reporting mode, select a CQI of the plurality of CQIs corresponding to the highest throughput among the plurality of throughputs; and in a second CQI reporting mode, report the selected CQI that remains the same during the second CQI reporting mode to the base station while the channel remains temporally uncorrelated.

20. The non-transitory computer-readable storage medium of claim 19, wherein the CQI reporting code further causes the UE to:

determine a first signal-to-interference-plus-noise ratio (SINR) of the channel in a CQI reference period;

determining a second SINR of the channel in a transport block size (TBS) received period; and if a correlation coefficient of the first SINR and the second SINR is less than a threshold, determine that the channel is temporally uncorrelated.

21. The non-transitory computer-readable storage medium of claim 19, wherein the CQI reporting code further causes the UE to:

if the UE is moving at a speed higher than a threshold, increase the reported CQI.

22. The non-transitory computer-readable storage medium of claim 19, wherein the throughput is determined by a first equation defined as:

$$\frac{\int_0^\infty \sum_{i=1}^{M} h(i,\gamma) f_{\Lambda_{n-4}\Gamma_n}(i,\gamma) d\gamma}{\int_0^\infty \sum_{i=1}^{M} g(i,\gamma) f_{\Lambda_{n-4}\Gamma_n}(i,\gamma) d\gamma},$$

where $\Lambda_{n-4}$ is a CQI reported at subframe n−4, $\Gamma_n$ is a signal-to-noise ratio (SNR) at subframe n, M is a maximum CQI or transport block size (TBS) index, and $f_{\Lambda_{n-4}\Gamma_n}$ is a joint probability distribution of $\Lambda_{n-4}$ and $\Gamma_n$.

23. The non-transitory computer-readable storage medium of claim 22, wherein the CQI reporting code further causes the UE to:

maximize the first equation; and select the CQI among the plurality of CQIs corresponding to the maximized first equation.

24. The non-transitory computer-readable storage medium of claim 19, wherein the channel comprises a physical propagation path between the base station and the UE.

* * * * *